US006486260B1

(12) United States Patent
Yuasa et al.

(10) Patent No.: US 6,486,260 B1
(45) Date of Patent: Nov. 26, 2002

(54) CEMENT ADDITIVE, CEMENT COMPOSITION AND POLYCARBOXYLIC ACID POLYMER

(75) Inventors: Tsutomu Yuasa, Osaka (JP); Hirokatsu Kawakami, Sakai (JP); Tsuyoshi Hirata, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/472,968

(22) Filed: Dec. 28, 1999

(30) Foreign Application Priority Data

Dec. 28, 1998 (JP) .......................... 10-373893
May 13, 1999 (JP) .......................... 11-133330

(51) Int. Cl.$^7$ ....................... C08F 222/02; C08F 222/20
(52) U.S. Cl. ..................... 525/327.7; 525/339; 525/384
(58) Field of Search .............................. 525/327.7, 339, 525/384

(56) References Cited

U.S. PATENT DOCUMENTS

| 3,563,930 A | | 2/1971 | Stram et al. ................... 260/40 |
| 4,460,627 A | * | 7/1984 | Weaver et al. ............... 427/212 |
| 5,158,996 A | | 10/1992 | Valenti ............................ 524/5 |
| 5,660,626 A | | 8/1997 | Ohta et al. .................. 106/810 |
| 5,665,842 A | | 9/1997 | Leikauf ....................... 526/279 |
| 5,668,195 A | | 9/1997 | Leikauf ........................... 524/5 |
| 5,731,368 A | * | 3/1998 | Stanley et al. ............... 523/340 |
| 5,912,284 A | * | 6/1999 | Hirata et al. ................... 524/5 |

FOREIGN PATENT DOCUMENTS

| EP | 0 306 449 A | 3/1989 |
| EP | 0850894 A1 * | 1/1998 |
| GB | 2 285 048 A | 12/1993 |
| JP | 6-256054 | 9/1994 |
| JP | 7216026 | 6/1995 |
| JP | 8268741 | 10/1996 |
| WO | WO 97 39037 A | 10/1997 |
| WO | WO 98 51640 A | 11/1998 |

* cited by examiner

Primary Examiner—D. R. Wilson
(74) Attorney, Agent, or Firm—Connolly Bove Lodge & Hutz LLP

(57) ABSTRACT

The present invention has for its object to provide an economical cement additive capable of reducing the amount of water to be added to cement compositions and still capable of providing cement compositions with high fluidity, good processability, and a proper level of air-entraining ability resulting from sufficient foaming prevention, at low addition levels, a cement composition in which the above cement additive is used, and a polycarboxylic acid polymer excellent in dispersing effects on cement particles or inorganic powders or pigments and capable of being used with advantage as a cement additive or a dispersant for various uses.

The invention provides, among others, a cement additive comprising, as main component, a polycarboxylic acid polymer (X) which has; repeating units (A), (B), (C) and (D), wherein none of the proportion of occurrence S1 of repeating unit (A) the proportion of occurrence T1 of repeating unit (B) and the proportion of occurrence E1 of repeating unit (C) is not equal to zero, the average number n of moles of an oxyalkylene group as added in repeating unit (B) is not less than 110, and that the weight average molecular weight of said polycarboxylic acid polymer is not less than 10000.

6 Claims, No Drawings

CEMENT ADDITIVE, CEMENT COMPOSITION AND POLYCARBOXYLIC ACID POLYMER

TECHNICAL FIELD

The present invention relates to a cement additive having good fluidity and foaming preventing activity, to a cement composition and to a polycarboxylic acid polymer which can be judiciously used as a cement additive or a dispersant for various uses.

BACKGROUND ART

Cement compositions can give cured products excellent in strength and durability and therefore have a wide range of applications, for example as outer wall materials, i.e. sidings, for buildings and structures.

For increasing the air-entraining property and fluidity of such cement compositions, cement additives are generally used in said compositions. The importance of such additives known collectively as additive has recently been more and more recognized and technological innovations have actively been made.

The task of cement additive is to allow cement compositions to exhibit sufficient dispersibility even when the level of addition of water is reduced, to thereby secure the fluidity and processability of the cement compositions and realize improvements in durability and strength as a result of water reduction and, at the same time, give good cement compositions while retaining a proper level of air-entraining property.

U.S. Pat. No. 3,563,930 discloses a cement composition which contains a compound comprising a styrene-maleic anhydride copolymer and/or a styrene-maleic anhydride copolymer half ester. However, although this styrene-maleic anhydride copolymer produces a good air-entraining effect, it has a molecular weight as low as 500 to 5000, hence the half-esterified copolymer also has a low molecular weight; Thus, the number of carboxyl groups and that of polyalkylene glycol residues per molecule are small and, as a result, the ability of said compound to be adsorbed on cement particles is poor and sufficient dispersibility can never be obtained.

JP Kokai H01-92212 discloses a fluidity improving agent for cement compositions which is a styrene-maleic anhydride and maleic acid half ester copolymer whose maleic acid half ester moiety is derived from maleic anhydride units by addition of a polyalkylene glycol. In this copolymer, however, the number of oxyalkylene groups, which are repeating units of the polyalkylene glycol, is not more than 100 and, as a result, said copolymer is insufficient in hydrophilicity and steric repulsion toward cement, so that a required level of dispersibility cannot be obtained. Further, the occurrence ratio between maleic anhydride units and maleic acid half ester units is 1:3 to 1:100 and, thus, the proportion of the carboxyl group is relatively small, so that the ability to be adsorbed on cement particles is poor and no sufficient dispersibility can be obtained.

JP Kokai H07-216026 discloses a fluidizing agent for cement-like compositions which comprises a free acid form or salt form random copolymer composed of a specific hydrocarbon monomer, a maleic acid monomer and a maleic acid half ester monomer derived by addition of a polyalkylene glycol. In this copolymer, however, the number of oxyalkylene groups, which are polyalkylene glycol-derived repeating units, is not more than 100, so that the hydrophilicity and steric repulsion are not sufficient, hence the required level of dispersibility cannot be obtained. Further, the occurrence ratio between the maleic acid monomer and maleic acid half ester monomer is 5:1 to 1:100 and thus the proportion of the carboxyl group is small; the ability to be adsorbed on cement particles is therefore poor and no sufficient dispersibility can be obtained.

JP Kokai H06-256054 discloses a cement dispersing agent which comprises a maleic anhydride copolymer alkyl polyalkylene glycol ester. However, this copolymer, like those mentioned above, not sufficient in hydrophilicity and steric repulsion and cannot have the required level of dispensability. In addition, it is poor in ability to be adsorbed on cement particles and fails to exhibit sufficient dispersibility.

JP H08-268741 discloses a cement dispersing agent for reducing drying shrinkage which comprises a graft polymer derived from a polycarboxylic acid or a salt thereof by chemically binding, to side chains thereof, an oligoalkylene glycol and/or a polyhydric alcohol, together with a polyalkylene glycol or a derivative thereof. However, in this graft polymer, the number of oxyalkylene groups, which are repeating units of the polyalkylene glycol or the derivative thereof, is about 12, so that said graft polymer is insufficient in hydrophilicity and steric repulsion toward cement and no necessary dispersibility can be obtained. A technology is also disclosed of using an ethylene oxide-propylene oxide block copolymer having foaming preventing activity as the polyalkylene glycol or the derivative thereof for adjusting the air-entraining property. This graft polymer, however, cannot have sufficient dispersibility, as mentioned above, so that it cannot contribute to water reduction, hence the intended improvements in durability and strength by synergistic effects of water reduction and foaming prevention cannot be realized.

U.S. Pat. No. 5,660,626 discloses a shrinkage reducing agent which comprises a graft copolymer polycarboxylic acid or a salt thereof whose side chains are modified with an oligoalkylene glycol or the like. This graft copolymer is indeed excellent in drying shrinkage of cement compositions but is insufficient in hydrophilicity and steric repulsion toward cement, hence it fails to acquire the required dispersibility.

Polycarboxylic acid polymers are used as cement additives, as mentioned above and, when they have a dispersing effect on various inorganic powders and pigments, they can be used also as dispersing agents for inorganic pigments for paper coating, dispersing agents for paper filler pigments, dispersing agents for pigments for water paints, dispersing agents for pigments for water inks and like dispersing agents, since they have no coloration problem as compared with such dispersing agents as naphthalenesulfonic acid salts. They can further be used as builders for detergents, descaling agents and so forth. The advent of polycarboxylic acid polymers having sufficient dispersing effects on various inorganic powders and pigments has been awaited.

SUMMARY OF INVENTION

The present invention has for its object to solve the above problems and provide an economical cement additive capable of reducing the amount of water to be added to cement compositions and showing high fluidity, good processability, and a proper level of air-entraining activity owing to sufficient foaming prevention, at low addition levels, a cement composition in which said cement additive is used, and a polycarboxylic acid polymer excellent in dispersing effects on cement particles or inorganic powders or pigments, having no coloration or other problems and capable of being used with advantage as a cement additive or a dispersant for various uses.

The cement additive of the present invention comprises, as a main component, a polycarboxylic acid polymer (X) which has;

a repeating unit (A) represented by the general formula (1);

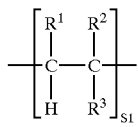
(1)

[wherein $R^1$ and $R^2$ are the same or different and each represents a hydrogen atom or a univalent hydrocarbon group containing 1 to 30 carbon atoms and the carbon chains of $R^1$ and $R^2$ may partly be bound together; R represents a hydrogen atom, a phenyl group, an alkylphenyl group, a sulfonated phenyl group, an alkyl group containing 1 to 30 carbon atoms, an alkenyl group containing 2 to 30 carbon atoms, or a univalent organic group selected from the group consisting of —OR, —OCOR, —$X^1OR^6$, —O($R^7O$)a$R^8$ and —CN; $R^4$ and $R^5$ each represents a univalent hydrocarbon group containing 1 to 30 carbon atoms; $X^1$ represents a bivalent hydrocarbon group containing 1 to 3 carbon atoms; $R^6$ and $R^8$ each represents a hydrogen atom or a univalent hydrocarbon group containing 1 to 30 carbon atoms; $R^7$ represents an alkylene group containing 2 to 30 carbon atoms; a represents the average number of moles of the oxyalkylene group represented by —($R^7O$)— as added and is a positive number of 1 to 300; and S1 represents the proportion of occurrence (mole ratio) of the repeating unit in the polycarboxylic acid polymer (X)], a repeating unit (B) represented by the general formula (2);

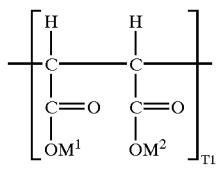
(2)

[wherein $M^1$ and $M^2$ are the same or different and each represents a hydrogen atom, a metal atom, an ammonium group or an organic amine group; and T1 represents the proportion of occurrence (mole ratio) of the repeating unit in the polycarboxylic acid polymer (X)], a repeating unit (C) represented by the general formula (3);

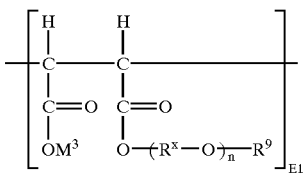
(3)

[wherein $M^3$ represents a hydrogen atom, a metal atom, an ammonium group or an organic amine group; $R^9$ represents a univalent hydrocarbon group containing 1 to 30 carbon atoms; the $R^X$ groups are the same or different and each represents an alkylene group containing 2 to 18 carbon atoms, the majority of which are ethylene groups; n represents the average number of moles of the oxyalkylene group represented by —($R^XO$)— as added and is a positive number; and E1 represents the proportion of occurrence (mole ratio) of the repeating unit in the polycarboxylic acid polymer (X)], and a repeating unit (D) represented by the general formula (4);

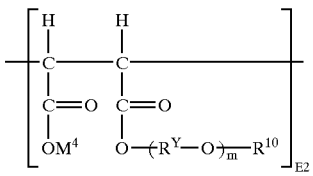
(4)

[wherein $M^4$ represents a hydrogen atom, a metal atom, an ammonium group or an organic amine group; $R^{10}$ represents a univalent hydrocarbon group containing 1 to 30 carbon atoms; the $R^Y$ groups are the same or different and each represents an alkylene group containing 2 to 18 carbon atoms, the majority of which are alkylene groups containing not less than 3 carbon atoms; m represents the average number of moles of the oxyalkylene group represented by —($R^YO$)— as added and is a positive number; and E2 represents the proportion of occurrence (mole ratio) of the repeating unit in the polycarboxylic acid polymer (X)], under the conditions that none of S1, T1 and E1 is equal to 0 (zero), that n is not less than 110, and that the weight average molecular weight (Mw) of said polycarboxylic acid polymer is not less than 10000.

The present invention is also concerned with a method of producing polycarboxylic acid polymers (X) suited for use in cement additives and having a repeating unit (A) represented by the general formula (1);

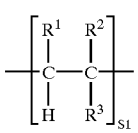
(1)

[wherein $R^1$ and $R^2$ are the same or different and each represents a hydrogen atom or a univalent hydrocarbon group containing 1 to 30 carbon atoms and the carbon chains of $R^1$ and $R^2$ may partly be bound together; $R^3$ represents a hydrogen atom, a phenyl group, an alkylphenyl group, a sulfonated phenyl group, an alkyl group containing 1 to 30 carbon atoms, an alkenyl group containing 2 to 30 carbon atoms, or a univalent organic group selected from the group consisting of —OR$^4$, —OCOR$^5$, —X$^1$OR$^6$, —(R$^7$O)aR$^8$ and —CN; R$^4$ and R$^5$ each represents a univalent hydrocarbon group containing 1 to 30 carbon atoms; X$^1$ represents a bivalent hydrocarbon group containing 1 to 3 carbon atoms; R$^6$ and R$^8$ each represents a hydrogen atom or a univalent hydrocarbon group containing 1 to 30 carbon atoms; R$^7$ represents an alkylene group containing 2 to 30 carbon atoms; a represents the average number of moles of the oxyalkylene group represented by —(R$^7$O)— as added and is a positive number of 1 to 300; and S1 represents the proportion of occurrence (mole ratio) of the repeating unit in the polycarboxylic acid polymer (X)], a repeating unit (B) represented by the general formula (2);

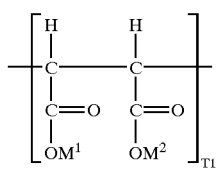
(2)

[wherein M$^1$ and M$^2$ are the same or different and each represents a hydrogen atom, a metal atom, an ammonium group or an organic amine group; and T1 represents the proportion of occurrence (mole ratio) of the repeating unit in the polycarboxylic acid polymer (X)], a repeating unit (C) represented by the general formula (3);

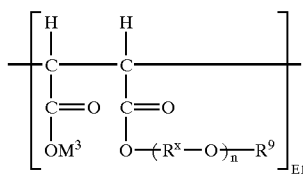
(3)

[wherein M$^3$ represents a hydrogen atom, a metal atom, an ammonium group or an organic amine group; R$^9$ represents a univalent hydrocarbon group containing 1 to 30 carbon atoms; the R$^X$ groups are the same or different and each represents an alkylene group containing 2 to 18 carbon atoms, the majority of which are ethylene groups; n represents the average number of moles of the oxyalkylene group represented by —(R$^X$O)— as added and is a positive number; and E1 represents the proportion of occurrence (mole ratio) of the repeating unit in the polycarboxylic acid polymer (X)], and a repeating unit (D) represented by the general formula (4);

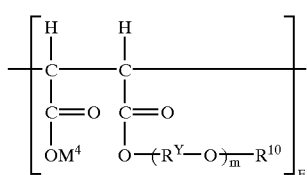
(4)

[wherein M$^4$ represents a hydrogen atom, a metal atom, an ammonium group or an organic amine group; R$^{10}$ represents a univalent hydrocarbon group containing 1 to 30 carbon atoms; the R$^Y$ groups are the same or different and each represents an alkylene group containing 2 to 18 carbon atoms, the majority of which are alkylene groups containing not less than 3 carbon atoms; m represents the average number of moles of the oxyalkylene group represented by —(R$^Y$O)— as added and is a positive number; and E2 represents the proportion of occurrence (mole ratio) of the repeating unit in the polycarboxylic acid polymer (X)], with the conditions that none of S1, T1 and E1 is equal to 0 (zero), that n is not less than 110 and that the weight average molecular weight (Mw) of said polycarboxylic acid polymer is not less than 10000, which comprises subjecting to esterification reaction a polycarboxylic acid polymer (X-1) having a repeating unit (E) represented by the general formula (5);

(5)

[wherein R$^1$, R$^2$ and R$^3$ are as defined above and U represents the proportion of occurrence (mole ratio) of the repeating unit in said polycarboxylic acid polymer (X-1)] and a repeating unit (F) represented by the general formula (6);

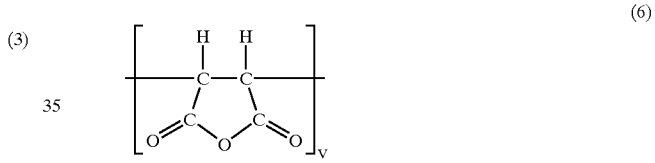
(6)

[wherein V represents the proportion of occurrence (mole ratio) of the repeating unit in said polycarboxylic acid polymer (X-1)] and having a weight average molecular weight of not less than 8000 and a polyalkylene glycol (X-2) represented by the general formula (7);

(7)

[wherein the R$^Z$ groups are the same or different and each represents an alkylene group containing 2 to 18 carbon atoms, d represents the average number of moles of the oxyalkylene group represented by —(R$^Z$—O)— as added and is a positive number and R$^1$ represents a hydrocarbon group containing 1 to 30 carbon atoms].

The present invention is further concerned with a cement additive comprising a polymer, as a main component, wherein said polymer is such that a mortar containing said polymer has flow value of not less than 250 mm as determined by using a flow cone.

The present invention is still further concerned with a cement composition which comprises cement, water and the cement additive defined above.

Furthermore, the present invention is concerned with a polycarboxylic acid polymer which has a repeating unit (G) represented by the general formula (8);

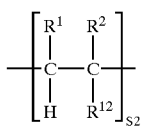

(8)

[wherein $R^1$ and $R^2$ are the same or different and each represents a hydrogen atom or a univalent hydrocarbon group containing 1 to 30 carbon atoms and the carbon chains of $R^1$ and $R^2$ may partly be bound together; $R^{12}$ represents —$OR^4$; $R^4$ represents a univalent hydrocarbon group containing 1 to 30 carbon atoms; and S2 represents the proportion of occurrence (mole ratio) of the repeating unit in the polycarboxylic acid polymer], a repeating unit (H) represented by the general formula (9);

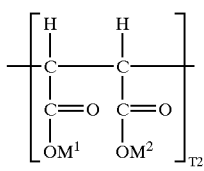

(9)

[wherein $M^1$ and M2 are the same or different and each represents a hydrogen atom, a metal atom, an ammonium group or an organic amine group; and T2 represents the proportion of occurrence (mole ratio) of the repeating unit in the polycarboxylic acid polymer], a repeating unit (I) represented by the general formula (10);

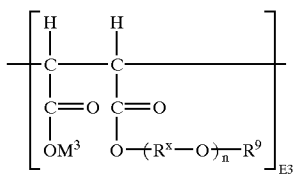

(10)

[wherein $M^3$ represents a hydrogen atom, a metal atom, an ammonium group or an organic amine group; $R^9$ represents a univalent hydrocarbon group containing 1 to 30 atoms; the $R^x$ groups are the same or different and each represents an alkylene group containing 2 to 18 carbon atoms, the majority of which are ethylene groups; n represents the average number of moles of the oxyalkylene group represented by —($R^xO$)— as added and is a positive number; and E3 represents the proportion of occurrence (mole ratio) of the repeating unit in the polycarboxylic acid polymer], and a repeating unit (J) represented by the general formula (11);

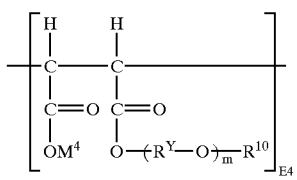

(11)

[wherein $M^4$ represents a hydrogen atom, a metal atom, an ammonium group or an organic amine group; $R^{10}$ represents a univalent hydrocarbon group containing 1 to 30 carbon atoms; the $R^Y$ groups are the same or different and each represents an alkylene group containing 2 to 18 carbon atoms, the majority of which are alkylene groups containing not less than 3 carbon atoms; and m represents the average number of moles of the oxyalkylene group represented by —($R^YO$)— as added and is a positive number; and E4 represents the proportion of occurrence (mole ratio) of the repeating unit in the polycarboxylic acid polymer]

under the conditions that neither of S2 and E3 is equal to 0 (zero) and that n is not less than 110.

DISCLOSURE OF THE INVENTION

In the following, the present invention is described in further detail.

The cement additive according to the present invention comprises the polycarboxylic acid polymer (X) as the main component. The content of said polycarboxylic acid polymer (X) in said cement additive is not particularly restricted as long as it serves as the main constituent of said additive. Only one species of said polycarboxylic acid polymer (X) may be used or two or more species thereof may be used combinedly.

Said polycarboxylic acid polymer (X) has the repeating units (A), (B), (C) and (D).

The repeating unit (A) constitutes the basis of the polycarboxylic acid polymer (X), the repeating unit (B) serves an important function in allowing the polycarboxylic acid polymer (X) to be adsorbed on cement particles, the repeating unit (C) serves an important function in allowing the cement composition to show dispersibility owing to the hydrophilicity of the oxyalkylene groups and the steric repulsion resulting therefrom, and the repeating unit (D) serves an important function in allowing the cement composition to show proper air-entraining properties based on the foaming preventing effect of the oxyalkylene groups.

In accordance with the present invention, the repeating unit (A) is represented by the above general formula (1). In the present specification, the term "average number of moles of an organic group as added" means the average number of moles of said organic group, namely any of the repeating units constituting the polymer, as added on the per mole basis.

Where $R^3$ is alkylphenyl, alkyl, alkenyl, —$OR^4$, —$OCOR^5$, —$X^1OR^6$ or —$O(R^7O)aR^8$ and when the number of carbon atoms is in excess of that respectively defined above, the hydrophilicity of the polycarboxylic acid polymer (X) will be low and the dispersibility of the cement composition may be poor in certain instances.

In accordance with the present invention, the repeating unit (B) is represented by the above general formula (2).

The above-mentioned metal atom is not particularly restricted but includes, among others, univalent metal atoms, for example alkali metal atoms such as lithium, sodium and potassium; bivalent metal atoms, for example alkaline earth metal atoms such as calcium and magnesium; and trivalent metal atoms such as aluminum and iron. These may be used singly or two or more of them may be used combinedly.

The above-mentioned organic amine group is not particularly restricted but includes, among others, ethanolamine and triethylamine groups. These may be used singly or two or more of them may be used combinedly. Further, $M^1$ and $M^2$ each may comprise an ammonium group.

The —$COOM^1$ group and —$COOM^2$ group in the repeating unit (B) mentioned above form carboxy anions in cement compositions as a result of dissociation of $M^1$ and $M^2$, which anions have an affinity for the positively charged cement particle surface; thus, said groups perform their function by allowing the polycarboxylic acid polymer (X) to be adsorbed on cement particles. Therefore, from the viewpoint of strong tendency toward dissociation, it is preferred that $M^1$ and $M^2$ each be a hydrogen atom or a univalent metal atom.

In accordance with the present invention, the repeating unit (C) is represented by the above general formula (3).

The above-mentioned atom or group $M^3$ has the same function as that of $M^1$ and $M^2$ in the repeating unit (B) mentioned above.

When the number of carbon atoms contained in the group $R^9$ exceeds 30, the hydrophilicity of the group —$(R^XO)nR^9$ becomes weak and the dispersibility of cement compositions becomes poor.

For avoiding any substantial impairment in the hydrophilicity of the oxyalkylene group and thus allowing cement compositions to satisfactorily exhibit their dispersibility, the group $R^9$ is preferably a saturated straight hydrocarbon group containing 1 to 3 carbon atoms, such as methyl, ethyl or propyl. For allowing cement compositions to satisfactorily exhibit their dispersibility and preventing the ingredients incorporated in cement compositions from separating, said group is preferably a saturated straight hydrocarbon group containing 4 to 8 carbon atoms, such as n-butyl, i-propyl, pentyl or hexyl. For preventing the separation of ingredients incorporated in cement compositions, it is preferably a saturated straight hydrocarbon group containing 9 to 18 carbon atoms, such as lauryl or stearyl. Thus, it is preferable to employ an appropriate combination of these.

In cases where two or more oxyalkylene groups represented by —$(R^XO)$— in general formula (3) exist in one and the same repeating unit (C), the oxyalkylene groups represented by —$(R^XO)$— may take any addition form, for example the form of random addition, block addition or alternating addition.

The major constituent of such $R^X$ groups is ethylene.

The term "major or majority" as used herein means that where a plurality of oxyalkylene species are present in the repeating unit, the major or majority constituent accounts for the majority of the oxyalkylene groups existing. When, in accordance with the present invention, the majority constituent of $R^X$ groups is ethylene in the oxyalkylene groups, the desired effect of the repeating unit (C) can be produced. The proportion of occurrence of the ethylene group which is sufficient to produce said effect is thus "major" in the above sense, hence corresponds to the "majority" defined herein.

In the repeating unit (C), the "majority" in the sense mentioned above, when expressed in terms of number based on n, is, for example not less than n×0.5, preferably not less than n×0.6, more preferably not less than n×0.7, still more preferably not less than n X×0.8 and most preferably not less than n×0.9.

Those oxyalkylene groups in which the $R^X$ group is an alkylene group containing 3 or more carbon atoms, namely other than ethylene, inhibit the hydrolysis of the oxyalkylene groups in cement compositions, which are alkaline in nature, and therefore serve an important function in retaining the fluidity of cement compositions. For the oxyalkylene groups in the repeating unit (C) to perform such function, the $R^X$ group other than ethylene is preferably one containing a relatively small number of carbon atoms, for example propylene or butylene.

In accordance with the present invention, the repeating unit (D) is represented by the above general formula (4).

The above-mentioned atom or group $M^4$ has the same function as that of $M^1$ and $M^2$ in the repeating unit (B) mentioned hereinabove.

When the number of carbon atoms contained in the group $R^{10}$ exceeds 30, the hydrophobicity of the group —$(R^YO)$ $R^{10}$ becomes excessively strong and the dispersibility of cement compositions becomes impaired.

For allowing cement compositions to satisfactorily exhibit their dispersibility and have adequate air-entraining properties, the group $R^{10}$ is preferably a univalent hydrocarbon group containing 4 to 25 carbon atoms. More preferred are univalent hydrocarbon groups containing 8 to 22 carbon atoms, most preferably 12 to 20 carbon atoms. Further preferred are univalent hydrocarbon groups containing 4 to 10 carbon atoms.

In cases where two or more oxyalkylene groups represented by —$(R^YO)$— in general formula (4) exist in one and the same repeating unit (C), the oxyalkylene groups represented by —$(R^YO)$— may take any addition form, for example the form of random addition, block addition or alternating addition.

The major constituent of such $R^Y$ groups is an alkylene group containing not less than 3 carbon atoms.

As mentioned above, the term "major or majority" as used herein means that where a plurality of oxyalkylene species are present in the repeating unit, the major or majority constituent accounts for the majority of the oxyalkylene groups existing. When, in accordance with the present invention, the majority constituent of $R^Y$ groups in the oxyalkylene groups is an alkylene group containing not less than 3 carbon atoms, the desired effect of the repeating unit (D) can be produced. The proportion of occurrence of the saturated straight hydrocarbon group containing not less than 3 carbon atoms which is sufficient to produce said effect is thus "major" in the above sense, hence corresponds to the "majority" defined herein.

In the repeating unit (D), the "majority" in the sense mentioned above, when expressed in terms of number based on m, is, for example not less than m×0.5, preferably not less than m×0.6, more preferably not less than m×0.7, and most preferably not less than m×0.8.

Among the $R^YO$ groups, oxypropylene and oxybutylene are preferred from the viewpoint of easy synthesis of —$(R^YO)m$—.

Unless the effects of the present invention are impaired, the polycarboxylic acid polymer (X) mentioned above may contain another repeating unit [the proportion of occurrence of said repeating unit in said polycarboxylic acid polymer (X) being represented by S1'].

In the above polycarboxylic acid polymer (X), the repeating units (A), (B), (C) and (D) and the other optional repeating unit each comprises one, two or more species.

In the above polycarboxylic acid polymer (X), the repeating units (A), (B), (C) and (D) and the other optional repeating unit each may have any addition form, for example the form of random addition, block addition or alternating addition.

In the above polycarboxylic acid polymer (X), S1+T1+E1+E2+S1' is equal to 1.

In the above polycarboxylic acid polymer (X), none of S1, T1 and E1 is equal to 0 (zero). Therefore, the polycarboxylic acid polymer (X) contains the repeating units (A), (B) and (C) and optionally contains the repeating unit (D) and/or the other repeating unit.

When the polycarboxylic acid polymer (X) contains the repeating unit (D), cement compositions having adequate air-entraining properties can be obtained.

In the repeating unit (C), the number n of the oxyalkylene groups is not less than 110. When n is less than 110, the oxyalkylene groups in the repeating unit (C) in the polycarboxylic acid polymer (X) adsorbed on cement particles fail to produce a sufficient steric repulsion effect on the cement particles, thus giving cement compositions poor in dispersibility. Considering that the oxyalkylene group preparation becomes difficult, n is preferably not more than 300, more preferably 120 to 250, still more preferably 130 to 200, most preferably 140 to 180.

That the oxyalkylene group in the repeating unit (C) comprises the oxyethylene group as the major constituent thereof and that n is not less than 110 synergistically enable the effect of causing steric repulsion of cement particles to be produced to a satisfactory extent.

In the above repeating units (C) and (D), the number na defined by the formula;

$$na=(n \times E1 + m \times E2)/(E1+E2)$$

represents the average number of moles of the oxyalkylene groups in the polycarboxylic acid polymer (X) as added. For sufficient dispersion of cement particles by means of the oxyalkylene groups in repeating unit (C) and sufficient foaming prevention in cement compositions by means of the oxyalkylene groups in repeating unit (D), said number na is preferably 80 to 300, more preferably 90 to 250, still more preferably 100 to 230, particularly 110 to 200, and most preferably 120 to 180.

As regards the proportions T1 and E1, it is preferred that the relation;

$$0.005 \leq E1/(T1+E1) \leq 0.7$$

be satisfied. When said ratio is less than 0.005, the mole ratio of the repeating unit (C) is considerably small, so that the oxyalkylene groups in the repeating unit (C) may fail to exhibit sufficient hydrophilicity and produce a sufficient steric repulsion effect on cement particles. When said ratio is higher than 0.7, the mole ratio of the repeating unit (B) is considerably small, so that the —$COOM^1$ and —$COOM^2$ groups in the repeating unit (B) may function less effectively in causing the polycarboxylic acid polymer (X) having the —$COOM^1$ and —$COOM^2$ groups to be adsorbed on cement particles. More preferred is the relation;

$$0.01 \leq E1/(T1+E1) \leq 0.4,$$

in particular, $$0.03 \leq E1/(T1+E1) \leq 0.3,$$

and most preferred is the relation;

$$0.05 \leq E1/(T1+E1) \leq 0.2.$$

In that manner, in spite of the fact that the mole ratio of the repeating unit (C) is smaller than that of the repeating unit (B), the desired effects can be produced to a satisfactory extent since the oxyalkylene groups in repeating unit (C) comprise the oxyethylene group as the major constituent and n is not less than 110. Since, therefore, the mole ratio of the repeating unit (B) can be selected at a higher level as compared with the mole ratio of the repeating unit (C), the repeating unit (B) can function more satisfactorily in causing the polycarboxylic acid polymer (X) to be adsorbed on cement particles.

In cases where E2 is not equal to 0 (zero), it is preferred that E1 and E2 satisfy the relation;

$$0.5 \leq E1/(E1+E2) \leq 0.99.$$

When the above ratio is below 0.5, the mole ratio of the repeating unit (D) is greater than that of the repeating unit (C), so that the hydrophobicity of the polycarboxylic acid polymer (X) becomes so strong that it may fail to disperse cement particles sufficiently. When said ratio is above 0.99, the repeating unit (D) can hardly be found, so that the effect of the oxyalkylene groups in repeating unit (D) cannot be fully produced, hence it may be impossible to prevent cement compositions from foaming. More preferred is the relation;

$$0.7 \leq E1/(E1+E2) \leq 0.9.$$

In that manner, even when the mole ratio of the repeating unit (D) is considerably smaller than that of the repeating unit (C), the desired effects of said unit (D) can satisfactorily be obtained since the oxyalkylene groups in the repeating unit (D) comprise, as the major constituent, an oxyalkylene group containing not less than 3 carbon atoms. Since, therefore, the mole ratio of the repeating unit (C) can be selected at a considerably higher level as compared with the mole ratio of the repeating unit (D), the oxyalkylene groups in repeating unit (C) the majority of which are oxyethylene groups can satisfactorily produce their effects.

In cases where E2 is not equal to 0 (zero), it is preferred that (T1+E1) and E2 satisfy the relation;

$$0.5 \leq (T1+E1)/(T1+E1+E2) \leq 0.999.$$

When the above ratio is below 0.5, the total mole ratio of the repeating units (B) and (C) is smaller than the mole ratio of the repeating unit (D), so that the effects of the repeating units (B) and (C) may not be fully produced, failing to cause satisfactory dispersion of cement particles. When it is in excess of 0.999, the repeating unit (D) can hardly be found, so that the desired effect of the repeating unit (D) cannot be fully produced, hence it may be impossible to prevent cement compositions from foaming. More preferred is the relation;

$$0.7 \leq (T1+E1)/(T1+E1+E2) \leq 0.995.$$

Most preferred is the relation;

$$0.9 \leq (T1+E1)/(T1+E1+E2) \leq 0.99.$$

In that manner, like the cases mentioned above, even when the mole ratio of the repeating unit (D) is considerably smaller than the total mole ratio of the repeating units (B) and (C), the desired effects of the repeating unit (D) can satisfactorily be obtained and, since the total mole ratio of the repeating units (B) and (C) can be selected at a considerably higher level as compared with the mole ratio of the repeating unit (D), the repeating units (B) and (C) can fully produce their effects in dispersing cement particles to a sufficient extent.

In the practice of the present invention, the weight average molecular weight (Mw) of the polycarboxylic acid polymer (X) is not less than 10000. When it is less than 10000, the repeating unit (B) cannot function effectively in allowing the polycarboxylic acid polymer (X) to be adsorbed on cement particles and the repeating unit (C) cannot produce its effect in causing dispersion of cement particles. When, conversely, the molecular weight of the polycarboxylic acid polymer (X) is in excess of 500000, a cement flocculating effect is unfavorably produced. To avoid the polycarboxylic acid polymer (X) becoming excessively viscous and difficult to handle, the weight average molecular weight of the polycarboxylic acid polymer (X) should preferably be not more than 500000, more preferably 20000 to 300000, in particular 30000 to 200000, most preferably 40000 to 100000.

When the cement additive of the present invention is used in cement compositions, the main constituent polycarboxylic acid polymer (X) can be adsorbed on cement particles to a sufficient extent and the oxyalkylene groups in repeating unit (C) the majority of which are oxyethylene groups can improve the dispersibility of cement particles by preventing said particles from aggregating together owing to the hydrophilicity of said oxyalkylene groups and the steric repulsion effect thereof as produced on said particles. Therefore, even when the amount of water is reduced, cement compositions can be provided with sufficient fluidity and through this water reduction, the durability, workability and strength of the cement compositions can be improved.

Further, the cement additive of the present invention makes it possible, in smaller amounts as compared with the conventional cement admixtures, to secure a certain level of workability in various cement compositions and, considering the fact that such cement compositions are widely used in various applications such as outer wall or structural members of buildings, the economical effect of said additive is remarkable.

Furthermore, the foaming preventing action of the oxyalkylene groups containing not less than 3 carbon atoms and occurring in the repeating unit (D) in the polycarboxylic acid polymer (X) provides cement compositions with appropriate air-entraining properties and, therefore, cement compositions with stabilized strength and durability characteristics can be obtained. Further, by using the additive of the invention, it is possible to provide cement compositions with foaming resistance without the addition of an antifoam which is required for the conventional cement admixtures. Thus, the labor required for the addition of a number of additives can be saved and the work efficiency in making cement compositions can be improved.

The method of producing the polycarboxylic acid polymer (X) of the present invention is not particularly restricted. Thus, for example, the method of producing the polycarboxylic acid polymer for use in cement additives which comprises subjecting a polycarboxylic acid polymer (X-1) and a polyalkylene glycol (X-2) to esterification may be applied.

In said method, the polycarboxylic acid polymer (X-1) has a repeating unit (E) represented by the general formula (5) given hereinabove and a repeating unit (F) represented by the general formula (6) given hereinabove and has a weight average molecular weight of not less than 8000.

Unless the effects of the present invention are impaired, said polycarboxylic acid polymer (X-1) may have an additional repeating unit [the proportion of occurrence (mole ratio) of such repeating unit is represented by U'].

In the above polycarboxylic acid polymer (X-1), U+V+U' is equal to 1.

When the weight average molecular weight (Mw) of said polycarboxylic acid polymer (X-1) is less than 8000, the product polycarboxylic acid polymer (X) cannot be fully effective in being adsorbed on and dispersing cement particles. When said molecular weight is in excess of 500000, an aggregating action is unfavorably produced on cement particles. Considering the viscosity of the polycarboxylic acid polymer (X-1) becoming excessively high and difficult to handle, the weight average molecular weight (Mw) of the polycarboxylic acid polymer (X-1) should preferably be not more than 500000, more preferably 15000 to 300000, in particular 25000 to 200000, most preferably 35000 to 100000.

Said polycarboxylic acid polymer (X-1) is not particularly restricted on conditions that the above conditions are satisfied. There may be mentioned, for example, copolymers obtainable by copolymerizing a monomer forming the repeating unit (E) and maleic anhydride, optionally together with some other monomer, in the conventional manner, and the like.

Said monomer forming the repeating unit (E) is not particularly restricted but includes, among others, styrene; alkyl-substituted styrenes such as o-methylstyrene, m-methylstyrene, p-methylstyrene, α-methylstyrene, ethylstyrene and propylstyrene, and derivatives thereof; styrenesulfonic acid; α-olefins such as ethylene, propylene, butylene, isobutylene, 1-pentene, 1-hexene, 1-decene and 1-octadecene, and other straight or branched olefins; cyclic olefins such as cyclopentene and cyclohexene; dienes such as butadiene, isoprene, 1,3-pentadiene and 2,4-hexadiene; alkyl vinyl ethers such as methyl vinyl ether, ethyl vinyl ether, propyl vinyl ether, butyl vinyl ether, isopropyl vinyl ether, isobutyl vinyl ether, 1,2-dimethoxyethylene, phenyl vinyl ether and benzyl vinyl ether; vinyl esters such as vinyl acetate, vinyl propionate and vinyl butanoate; unsaturated alcohols such as allyl alcohol, methallyl alcohol, 3-methyl-3-buten-1-ol, 3-methyl-2-buten-1-ol and 2-methyl-3-buten-2-ol; unsaturated alcohol adducts derived from the above unsaturated alcohol by etherifying the hydroxy group thereof with a hydrocarbon group containing 1 to 30 carbon atoms; vinyl alcohol-(poly)alkylene oxide adducts derived from vinyl alcohol by addition of 1 to 300 moles of an alkylene oxide containing 2 to 30 carbon atoms; vinyl alcohol-(poly)alkylene oxide adducts derived from the above vinyl alcohol-(poly)alkylene oxide adducts by etherifying the terminal hydroxy group thereof with a hydrocarbon group containing 1 to 30 carbon atoms; acrylonitrile, methacrylonitrile, and so forth. These may be used singly or two or more of them may be used combinedly.

The monomer for forming the above-mentioned additional repeating unit in the polycarboxylic acid polymer (X-1) is not particularly restricted but includes, among others, those monomers mentioned below, and one or two or more of them may be used.

(Meth)acrylic acid esters of the alkoxypolyalkylene glycols mentioned above; unsaturated alcohol-(poly)alkylene oxide adducts derived from the above-mentioned unsaturated alcohols by addition of 1 to 300 moles of an alkylene oxide containing 2 to 30 carbon atoms; unsaturated alcohol-(poly)alkylene oxide adducts derived from the above-mentioned unsaturated alcohol-(poly)alkylene oxide adducts by etherifying the terminal hydroxy group with a hydrocarbon group containing 1 to 30 carbon atoms; unsaturated dicarboxylic acids such as fumaric acid, itaconic acid and citraconic acid, and univalent metal salts, bivalent metal salts, ammonium salts and organic amine salts thereof, and acid anhydrides thereof; half esters and diesters of unsaturated dicarboxylic acids, such as maleic acid, fumaric acid, itaconic acid and citraconic acid, with alcohols containing 1 to 30 carbon atoms; half amides and diamides of such unsaturated dicarboxylic acids with amines containing 1 to 30 carbon atoms; half esters and diesters of alkylpolyalkylene glycols derived from such alcohols or amines containing 1 to 30 carbon atoms by addition of 1 to 500 moles of an oxyalkylene containing 2 to 18 carbon atoms with unsaturated dicarboxylic acids such as fumaric acid, itaconic acid and citraconic acid; half esters and diesters of such unsaturated dicarboxylic acids with glycols containing 2 to 18 carbon atoms or with polyalkylene glycols derived from such glycols by addition of 2 to 500 moles thereof; half amides of maleamic acid with glycols containing 2 to 18 carbon atoms or with polyalkylene glycols derived from such glycols by addition of 2 to 500 moles thereof; (meth) acrylic acid, univalent metal salts thereof, ammonium salts and organic amine salts thereof; (meth)acrylic acid esters of alkoxypolyalkylene glycols such as methoxypolyethylene glycol, ethoxypolyethylene glycol, propoxypolyethylene glycol, methoxypolyethylene glycol-polypropylene glycol, ethoxypolyethylene glycol-polypropylene glycol and propoxypolyethylene glycol-polypropylene glycol;

Esters of (meth)acrylic acid with alcohols containing 1 to 30 carbon atoms, such as methyl (meth)acrylate, ethyl (meth)acrylate, propyl (meth)acrylate, butyl (meth)acrylate, 2-ethylhexyl (meth)acrylate, 2-hydoxyethyl (meth)acrylate, hydroxypropyl (meth)acrylate, hydroxybutyl (meth) acrylate, methyl crotonate and glycidyl (meth)acrylte; (poly)alkylene glycol di(meth)acrylate such as triethylene glycol di(meth)acrylate, (poly)ethylene glycol di(meth) acrylate, (poly)propylene glycol di(meth)acrylate and (poly) ethylene glycol-(poly)propylene glycol di(meth)acrylate; bi- or trifunctional (meth)acrylates such as hexanediol di(meth) acrylate, trimethylolpropane tri(meth)acrylate and trimethylolpropane di(meth)acrylate; (poly)alkylene glycol dimaleates such as triethylene glycol dimaleate and polyethylene glycol dimaleate;

unsaturated sulfonic acid compounds and univalent metal salts, bivalent metal salts, ammonium salts and organic amine salts thereof, for example vinylsulfonates, (meth)allylsulfonates, 2-(meth)acryloxy-ethylsulfonates, 3-(meth)acryloxypropylsulfonates, 3-(meth)acryloxy-2-hydroxypropylsulfonates, 3-(meth)acryloxy-2-hydroxypropyl sulfophenyl ether, 3-(meth)acryloxy-2-hydroxypropyloxysulfobenzoates, 4-(meth)acryloxybutylsulfonates, (meth) acrylamidomethylsulfonic acid, (meth) acrylamidoethylsulfonic acid and 2-methylpropanesulfonic acid (meth)acrylamide; alkanediol mono(meth)acrylates such a-s 1,4-butanediol mono(meth)acrylate, 1,5-pentanediol mono (meth)acrylate and 1,6-hexanediol mono(meth) acrylate; amides of unsaturated monocarboxylic acids with amines containing 1 to 30 carbon atoms, for example methyl (meth) acrylamide; unsaturated amides such as (meth)acrylamide, (meth)acrylalkylamides; N-methylol(meth)acrylamide and N,N-dimethyl (meth)-acrylamdide;

unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; cyanurates such as triallyl cyanurate; allyl compounds such as (meth)allyl alcohol and glycidyl (meth)allyl ether; unsaturated amino compounds such as dimethylaminoethyl (meth)acrylate; siloxane derivatives such as polydimethylsiloxane-propylaminomaleamic acid, polydimethylsiloxane-aminopropyleneaminomaleamic acid, polydimethylsiloxane-bis(propylaminomaleamic acid), polydimethylsiloxane-bis (dipropyleneaminomaleamic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate);

unsaturated nitriles such as a-chloroacrylonitrile; divinyl aromatics such as divinylbenzene; allyl monomers such as allylacetic acid, allylbenzene, 2-allylphenol and 3-allylcyclopentane; allyl alcohol-derived monomers such as allyl ether and allyllactones; vinyl esters such as isopropenyl acetate; and vinyl aromatics.

Preferred as said polycarboxylic acid polymer (X-1) from the viewpoint of ready availability and inexpensiveness are styrene-maleic anhydride copolymers formed from styrene and maleic anhydride; α-olefin-maleic anhydride copolymers, alkyl vinyl ether-maleic anhydride copolymers; and vinyl ester-maleic anhydride copolymers. Among said alkyl vinyl ether-maleic anhydride copolymers, copolymers of maleic anhydride with vinyl ethers having relatively high hydrophilicity, such as methyl vinyl ether, ethyl vinyl ether, propyl vinyl ether and butyl vinyl ether, are particularly preferred and, among said vinyl ester-maleic anhydride copolymers, copolymers of maleic anhydride with highly hydrophilic vinyl esters, such as vinyl acetate, vinyl propionate and vinyl butanoate, are especially preferred.

The polyalkylene glycol (X-2) mentioned above is represented by the general formula (7) given above.

Said polyalkylene glycol (X-2) may comprise single species or a combination of two or more species.

Said polyalkylene glycol (X-2) is not particularly restricted but may be any one that is as mentioned above and enables the production of the polycarboxylic acid polymer (X) of the present invention. Thus, for example, there may be mentioned alkoxypolyalkylene glycols derived, by addition of one or two or more alkylene oxides containing 2 to 18 carbon atoms, from any of aliphatic alcohols containing 1 to 30 carbon atoms, such as methanol, ethanol, 2-propanol, 1-butanol, octanol, 2-ethyl-1-hexanol, nonyl alcohol, lauryl alcohol, cetyl alcohol and stearyl alcohol; alicyclic alcohols containing 3 to 30 carbon atoms, such as cyclohexanol; phenols or benzene ring-containing alcohols such as phenol, phenylmethanol (benzyl alcohol), methylphenol (cresol), p-ethylphenol, dimethylphenol (xylenol), p-tert-butylphenol, nonylphenol, dodecylphenol, phenylphenol and naphthol; alkoxypolyalkyleneglycols derived from alcohols which have alkenyl group containing 3 or 4 carbon atoms such as allyl alcohol, methallyl alcohol and crotyl alcohol by addition of one or two or more of alkylene oxide containing 2 to 18 carbon atoms.

Said alkoxypolyalkylene glycols are not particularly restricted but include, among others, the following;

methoxypolyethylene glycol, methoxypolyethylene glycol-(poly)propylene glycol, methoxypolyethylene glycol-(poly)butylene glycol, methoxypolyethylene glycol-(poly)propylene glycol-(poly)butylene glycol, methoxypolypropylene glycol, methoxypolypropylene glycol-(poly)ethylene glycol, methoxypolybutylene glycol, methoxypolybutylene glycol-(poly)ethylene glycol, ethoxypolyethylene glycol, ethoxypolyethylene glycol-(poly)propylene glycol, ethoxypolyethylene glycol-(poly)butylene glycol, ethoxypolyethylene glycol-(poly)propylene glycol-(poly)butylene glycol, ethoxypolypropylene glycol, ethoxypolypropylene glycol-(poly)ethylene glycol, ethoxypolybutylene glycol, ethoxypolybutylene glycol-(poly)ethylene glycol, propoxypolyethylene glycol, propoxypolyethylene glycol-(poly)propylene glycol, propoxypolyethylene glycol-(poly)butylene glycol, propoxypolyethylene glycol-(poly)propylene glycol-(poly)butylene glycol, propoxypolypropylene glycol, propoxypolypropylene glycol-(poly)ethylene glycol, propoxypolybutylene glycol, propoxypolybutylene glycol-(poly) ethylene glycol;

butoxypolyethylene glycol, butoxypolyethylene glycol-(poly)propylene glycol, butoxypolyethylene glycol- (poly)butylene glycol, butoxypolyethylene glycol-(poly)propylene glycol-(poly)butylene glycol, butoxypolypropylene glycol, butoxypolypropylene glycol-(poly)ethylene glycol, butoxypolybutylene glycol, butoxypolybutylene glycol-(poly)ethylene glycol, pentoxypolyethylene glycol, pentoxypolyethylene glycol-(poly)propylene glycol, pentoxypolyethylene glycol-(poly)butylene glycol, pentoxypolyethylene glycol-(poly)propylene glycol-(poly)butylene glycol, pentoxypolypropylene glycol, pentoxypolypropylene glycol-(poly)ethylene glycol, pentoxypolybutylene glycol, pentoxypolybutylene glycol-(poly)ethylene glycol, hexoxypolyethylene glycol, hexoxypolyethylene glycol-(poly)propylene glycol, hexoxypolyethylene glycol-(poly)butylene glycol, hexoxypolyethylene glycol-(poly)propylene glycol-(poly)butylene glycol, hexoxypolypropylene glycol, hexoxypolypropylene glycol-(poly)ethylene glycol, hexoxypolybutylene glycol, hexoxypolybutylene glycol, (poly)ethylene glycol, octoxypolyethylene glycol, octoxypolyethylene glycol-(poly)propylene glycol, octoxypolyethylene glycol-(poly)butylene glycol, octoxypolyethylene glycol-(poly)propylene glycol-(poly)butylene glycol, octoxypolypropylene glycol, octoxypolypropylene glycol-(poly)ethylene glycol, octoxypolybutylene glycol, octoxypolybutylene glycol-(poly)ethylene glycol;

decanoxypolyethylene glycol, decanoxypolyethylene glycol-(poly)propylene glycol, decanoxypolyethylene glycol-(poly)butylene glycol, decanoxypolyethylene glycol-(poly)propylene glycol-(poly)butylene glycol, decanoxypolypropylene glycol, decanoxypolypropylene glycol-(poly)ethylene glycol, decanoxypolybutylene glycol, decanoxypolybutylene glycol-(poly)ethylene glycol, dodecanoxypolyethylene glycol, dodecanoxypolyethylene glycol-(poly)propylene glycol, dodecanoxypolyethylene glycol-(poly)butylene glycol, dodecanoxypolyethylene glycol-(poly)propylene glycol-(poly)butylene glycol, dodecanoxypolypropylene glycol, dodecanoxypolypropylene glycol-(poly)ethylene glycol, dodecanoxypolybutylene glycol, dodecanxypolybutylene glycol-(poly)ethylene glycol, hexadecanoxypolyethylene glycol, hexadecanoxypolyethylene glycol-(poly)propylene glycol, hexadecanoxypolyethylene glycol-(poly)butylene glycol, hexadecanoxypolyethylene glycol-(poly)propylene glycol-(poly)butylene glycol, hexadecanoxypolypropylene glycol, hexadecanoxypolypropylene glycol-(poly)ethylene glycol, hexadecanoxypolybutylene glycol, hexadecanoxypolybutylene glycol-(poly)ethylene glycol, octadecanoxypolyethylene glycol, octadecanoxypolyethylene glycol-(poly)propylene glycol, octadecanoxypolyethylene glycol-(poly)butylene glycol, octadecanoxypolyethylene glycol-(poly)propylene glycol-(poly)butylene glycol, octadecanoxypolypropylene glycol, octadecanoxypolypropylene glycol-(poly)ethylene glycol, octadecanoxypolybutylene glycol, octadecanoxypolybutylene glycol-(poly)ethylene glycol;

phenoxypolyethylene glycol, phenoxypolyethylene glycol-(poly)propylene glycol, phenoxypolyethylene glycol-(poly)butylene glycol, phenoxypolyethylene glycol-(poly)propylene glycol-(poly)butylene glycol, phenoxypolypropylene glycol, phenoxypolypropylene glycol-(poly)ethylene glycol, phenoxypolybutylene glycol, phenoxypolybutylene glycol-(poly)ethylene glycol, phenylmethoxypolyethylene glycol, phenylmethoxypolyethylene glycol-(poly)propylene glycol, phenylmethoxypolyethylene glycol-(poly)butylene glycol, phenylmethoxypolyethylene glycol-(poly)propylene glycol-(poly)butylene glycol, phenylmethoxypolypropylene glycol, phenylmethoxypolypropylene glycol-(poly)ethylene glycol, phenylmethoxypolybutylene glycol, phenylmethoxypolybutylene glycol-(poly)ethylene glycol, methylphenoxypolyethylene glycol, methylphenoxypolyethylene glycol-(poly)propylene glycol, methylphenoxypolyethylene glycol-(poly)butylene glycol, methylphenoxypolyethylene glycol-(poly)propylene glycol, methylphenoxypolyethylene glycol-(poly)propylene glycol-(poly)butylene glycol, methylphenoxypolypropylene glycol, methylphenoxypolypropylene glycol-(poly)ethylene glycol, methylphenoxypolybutylene glycol, methylphenoxypolybutylene glycol-(poly)ethylene glycol, p-ethylphenoxypolyethylene glycol, p-ethylphenoxypolyethylene glycol-(poly)propylene glycol, p-ethylphenoxypolyethylene glycol-(poly)butylene glycol, p-ethylphenoxypolyethylene glycol-(poly)propylene glycol-(poly)butylene glycol, p-ethylphenoxypolypropylene glycol, p-ethylphenoxypolypropylene glycol-(poly)ethylene glycol, p-ethylphenoxypolybutylene glycol, p-ethylphenoxypolybutylene glycol-(poly)ethylene glycol; dimethylphenoxypolyethylene glycol, dimethylphenoxypolyethylene glycol-(poly)propylene glycol, dimethylphenoxypolyethylene glycol-(poly)butylene glycol, dimethylphenoxypolyethylene glycol-(poly)propylene glycol-(poly)butylene glycol, dimethylphenoxypolypropylene glycol, dimethylphenoxypolypropylene glycol-(poly)ethylene glycol, dimethylphenoxypolybutylene glycol, dimethylphenoxypolybutylene glycol-(poly)ethylene glycol, p-tert-butylphenoxypolyethylene glycol, p-tert-butylphenoxypolyethylene glycol-(poly)propylene glycol, p-tert-butylphenoxypolyethylene glycol-(poly)butylene glycol, p-tert-butylphenoxypolyethylene glycol-(poly)propylene glycol-(poly)butylene glycol, p-tert-butylphenoxypolypropylene glycol, p-tert-butylphenoxypolypropylene glycol-(poly)ethylene glycol, p-tert-butylphenoxypolybutylene glycol, p-tert-butylphenoxypolybutylene glycol-(poly)ethylene glycol, nonylphenoxypolyethylene glycol, nonylphenoxypolyethylene glycol-(poly)propylene glycol, nonylphenoxypolyethylene glycol-(poly)butylene glycol, nonylphenoxypolyethylene glycol-(poly)propylene glycol-(poly)butylene glycol, nonylphenoxypolypropylene glycol, nonylphenoxypolypropylene glycol-(poly)ethylene glycol, nonylphenoxypolybutylene glycol, nonylphenoxypolybutylene glycol-(poly)ethylene glycol, dodecylphenoxypolyethylene glycol, dodecylphenoxypolyethylene glycol-(poly)propylene glycol, dodecylphenoxypolyethylene glycol-(poly)butylene glycol, dodecylphenoxypolyethylene glycol-(poly)propylene glycol-(poly)butylene glycol, dodecylphenoxypolypropylene glycol, dodecylphenoxypolypropylene glycol-(poly)ethylene glycol, dodecylphenoxypolybutylene glycol, dodecylphenoxypolybutylene glycol-(poly)ethylene glycol;

phenylphenoxypolyethylene glycol, phenylphenoxypolyethylene glycol-(poly)propylene glycol, phenylphenoxypolyethylene glycol-(poly)butylene glycol, phenylphenoxypolyethylene glycol-(poly)propylene glycol-(poly)butylene glycol, phenylphenoxypolypropylene glycol, phenylphenoxypolypropylene glycol- (poly)ethylene glycol, phenylphenoxypolybutylene glycol, phenylphenoxypolybutylene glycol-(poly)ethylene glycol, naphthoxypolyethylene glycol, naphthoxypolyethylene glycol-(poly)propylene glycol, naphthoxypolyethylene glycol-(poly)butylene glycol, naphthoxypolyethylene glycol-(poly)propylene glycol-(poly)butylene glycol, naphthoxypolypropylene glycol, naphthoxypolypropylene glycol-(poly)ethylene glycol, naphthoxypolybutylene glycol, naphthoxypolybutylene glycol-(poly)ethylene glycol, methallyloxypolyethylene glycol, methallyloxypolyethylene glycol-(poly)propylene glycol, methallyloxypolyethylene glycol-(poly)butylene glycol, methallyloxypolyethylene glycol-(poly)propylene glycol-(poly)butylene glycol, methallyloxypolypropylene glycol, methallyloxypolypropylene glycol-(poly)ethylene glycol, methallyloxypolybutylene glycol, methallyloxypolybutylene glycol-(poly)ethylene glycol, allyloxypolyethylene glycol, allyloxypolyethylene glycol-(poly)propylene glycol, allyloxypolyethylene glycol-(poly)butylene glycol, allyloxypolyethylene glycol-(poly)propylene glycol-(poly)butylene glycol, allyloxypolypropylene glycol, allyloxypolypropylene glycol-(poly)ethylene glycol, allyloxypolybutylene glycol and allyloxypolybutylene glycol-(poly)ethylene glycol.

The esterification reaction to be employed in the production method of the present invention is not particularly restricted but may be carried out in the conventional manner, for example in a solvent using an esterification catalyst under the reaction conditions (reaction time, reaction temperature, etc.) appropriately selected.

Said solvent is not particularly restricted but includes, among others, benzene derivatives such as benzene, toluene and ethylbenzene; organic esters such as ethyl acetate and isopropyl acetate; ketones such as methyl ethyl ketone and methyl isobutyl ketone; and cyclic ethers such as tetrahydrofuran and 1,3-dioxane. The alkoxypolyalkylene glycols to be subjected to esterification may also be used as solvents. Further, the solvents used as polymerization solvents may be used as they are as solvents in the esterification reaction. In that case, the polymerization and esterification can be carried out continuously in successive steps. Such solvents may be used singly or two or more of them may be used combinedly.

Said esterification catalyst is not particularly restricted but includes, among others, acids such as sulfuric acid and p-toluenesulfonic acid; and tertiary amines such as triethylamine, triethanolamine and pyridine. These may used singly or two or more of them may be used combinedly.

It is also possible to subject an alkoxide form of the above polyalkylene glycol (X-2) and the above polycarboxylic acidpolymer (X-1) to esterification reaction. For converting the polyalkylene glycol (X-2) to an alkoxide form, metal hydride compounds such as sodium hydride and calcium hydride; alkali metals such as sodium; and organometallics such as n-butyllithium, methyllithium and phenyllithium can be used.

If necessary, the esterification reaction may be followed by conversion of part or the whole of the carboxyl groups in the polycarboxylic acid polymer to a salt form.

Furthermore, in cases where the polyalkylene glycol (X-2) is subjected to esterification reaction in an amount less than the equimolar amount relative to the repeating unit (F) in the polycarboxylic acid polymer (X-1), for instance, the reaction product may be esterified with an alkyl alcohol, such as methanol, ethanol, propanol, butanol, hexanol, lauryl alcohol, stearyl alcohol, phenol or benzyl alcohol, or amidated with an alkylamine, such as diethylamine or diisopropylamine.

When, in producing the polycarboxylic acid polymer (X), the conventional method of production is employed which comprises introducing an oxyalkylene group into a monomer by esterification reaction and then copolymerizing the resulting monomer with other monomers in order to produce a polycarboxylic acid polymer in which the average number of moles of the oxyalkylene group as added is large, the monomer with the oxyalkylene group introduced may partly remain unreacted since it has low copolymerizability with the other monomers.

By employing the method of the present invention for producing the polycarboxylic acid polymer for use in cement additive, it becomes possible to produce the polycarboxylic acid polymer (X) while attaining addition of not less than 110 moles, on average, of the oxyalkylene group, in a shortened esterification time and with increased production efficiency, without the possibility of unreacted monomers remaining, since the maleic anhydride group in the repeating unit (F) of the polycarboxylic acid polymer (X-1) can be readily esterified with the polyalkylene glycol (X-2) resulting from addition of a large number of moles of the oxyalkylene group.

The cement additive of the present invention may contain a polycarboxylic acid polymer (Y) in addition to the polycarboxylic acid polymer (X).

Said polycarboxylic acid polymer (Y), together with the polycarboxylic acid polymer (X), contributes toward retaining cement compositions in a dispersed state.

In the present specification, "retaining cement compositions in a dispersed state" means that stable dispersibility is maintained in the cement compositions after a certain lapse of time.

Said polycarboxylic acid polymer (Y) to be used may comprise one single species or a combination of two or more species.

The weight ratio between the polycarboxylic acid polymer (X) and polycarboxylic acid polymer (Y) in said cement additive is not particularly restricted but is preferably within the range of, for instance, 99/1 to 1/99, more preferably 90/10 to 10/90, still more preferably 80/20 to 20/80, most preferably 70/30 to 30/70.

Said polycarboxylic acid polymer (Y) has a repeating unit (K) represented by the general formula (12);

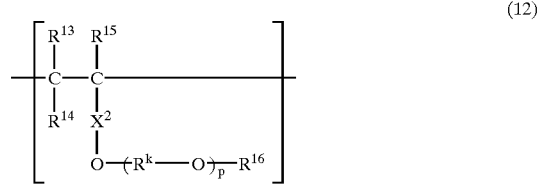

(12)

[wherein $R^{13}$, $R^{14}$, $R^{15}$ and $R^{16}$ are the same or different and each represents a hydrogen atom or a univalent hydrocarbon group containing 1 to 30 carbon atoms, $X^2$ represents a carbonyl group or a bivalent hydrocarbon group containing 1 to 3 carbon atoms, the $R^K$ groups are the same or different and each is an alkylene group containing 2 to 18 carbon atoms and p represents the average number of moles of the oxyalkylene group represented by —($R^K$O)— as added and is a positive number] and a repeating unit (L) having —$COOM^5$.

The function of said repeating unit (K) is to maintain the dispersion of cement compositions owing to the hydrophilicity and steric repulsion effect of the oxyalkylene group during the lapse of time and the function of said repeating unit (L), which has —COOM$^5$, is to cause the polycarboxylic acid polymer (Y) to be adsorbed on cement particles.

When, in the above repeating unit (K), said groups $R^{13}$, $R^{14}$, $R^{15}$ and $R^{16}$ each is a univalent hydrocarbon group, the number of carbon atoms therein is in excess of 30, the hydrophilicity of the polycarboxylic acid polymer (Y) maybe low and the cement dispersion maintaining ability may be poor.

Said group $R^{16}$ is the same as $R^9$ in the repeating unit (C) in the polycarboxylic acid polymer (X) mentioned above.

In cases where the oxyalkylene group represented by —($R^K$O)— includes two or more species in one and the same repeating unit (K), the oxyalkylene group represented by —($R^K$O)— may be in any mode of addition, for example random, block or alternating addition.

The above-mentioned group $R^K$ preferably comprises the ethylene group as the majority thereof. In that case, said group $R^K$ is the same as $R^X$ in the repeating unit (C) in the polycarboxylic acid polymer (X) mentioned above.

In the above-mentioned repeating unit (L) having —COOM$^5$, the group —COOM$^5$ has the same function as that of —COOM$^1$ and —COOM$^2$ in the repeating unit (B) in the polycarboxylic acid polymer (X).

The weight ratio between the repeating unit (K) and the repeating unit (L) having —COOM$^5$ in the polycarboxylic acid polymer (Y) is not particularly restricted but is preferably within the range of, for instance, 99/1 to 1/99. When the proportion of unit (K) is smaller than 1/99 and that of unit (L) is accordingly larger, the effect of the hydrophilicity of the oxyalkylene group in repeating unit (K) and the steric repulsion effect thereof on cement particles may not be produced. When the repeating unit (K) is more abundant than 99/1 and the repeating unit (L) is accordingly more scarce, the function to cause adsorption of the polycarboxylic acid polymer on cement particles maybe low and the cement dispersion maintaining ability may be poor. A more preferred range of said ratio is 99/1 to 50/50, in particular 95/5 to 60/40, most preferably 95/5 to 70/30

The above polycarboxylic acid polymer (Y) may have, when necessary, one or more repeating units other than the above repeating unit (K) and the repeating unit (L) having —COOM$^5$.

Said polycarboxylic acid polymer (Y) is not particularly restricted but may be any one falling within the above definition. Preferred are, for example, (meth)acrylic acid/(meth)acrylic acid polyalkylene glycol ester polymers, and/or maleic acid/unsaturated alcohol-polyalkylene glycol adduct polymers.

As such (meth)acrylic acid/(meth)acrylic acid polyalkylene glycol ester polymers, there may be mentioned those, which has;

a repeating unit (M) represented by the general formula (13);

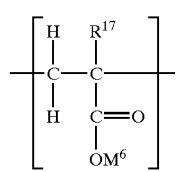

(13)

[wherein $R^{17}$ represents a hydrogen atom or a methyl group and $M^6$ has the same meaning as the symbol $M^5$ defined hereinabove has] and a repeating unit (N) represented by the general formula (14);

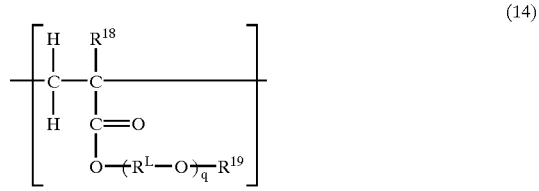

(14)

[wherein $R^{18}$ represents a hydrogen atom or a methyl group, $R^{19}$ represents a univalent hydrocarbon group containing 1 to 30 carbon atoms, the $R^L$ groups are the same or different and each is an alkylene group containing 2 to 18 carbon atoms and q represents the average number of moles of the oxyalkylene group represented by —($R^L$O)— as added and is a positive number between 1 to 300, inclusive].

Said group $R^{19}$ is the same as $R^{16}$. The oxyalkylene group represented by —($R^L$O)— in the above general formula (14) is the same as the oxyalkylene group represented by —($R^K$O)— in the above general formula (12). Said $R^L$ group is the same as the $R^K$ group mentioned hereinabove and preferably comprises the ethylene group as the majority thereof.

In the above (meth)acrylic acid/(meth)acrylic acid polyalkylene glycol ester polymers, $R^{18}$ is preferably a methyl group since, in that case, the oxyalkylene group —($R^L$O)— is more resistant to hydrolysis owing to the steric hindrance effect of said group and the cement dispersion maintaining effect is improved thereby.

For avoiding impairment of the hydrophilicity of the oxyalkylene group to thereby cause the cement dispersion maintaining effect to be fully produced and for preventing the ingredients incorporated in cement compositions from separating, the group $R^{19}$ preferably contains 1 to 10, more preferably 1 to 5, most preferably 1 to 3 carbon atoms.

Furthermore, for the oxyalkylene group in the repeating unit (N) in the (meth)acrylic acid/polyalkylene glycol (meth) acrylate polymers adsorbed on cement particles to fully produce its steric repulsion effect on the cement particles to thereby produce its cement dispersion maintaining effect to a satisfactory extent, said number q is preferably 10 to 250, more preferably 20 to 200, most preferably 25 to 150.

As said maleic acid/unsaturated alcohol-polyalkylene glycol adduct polymers, there may be mentioned those, which has;

a repeating unit (O) represented by the general formula (15);

(15)

[wherein $M^7$ and $M^8$ each has the same meaning as the symbol $M^5$ defined hereinabove has] and a repeating unit (P) represented by the general formula (16);

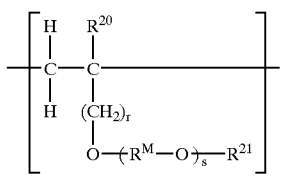

(16)

[wherein $R^{20}$ represents a hydrogen atom or a methyl group, $R^{21}$ represents a hydrogen atom or a univalent hydrocarbon group containing 1 to 30 carbon atoms, r is the number 1 or 2, the $R^M$ groups are the same or different and each is an alkylene group containing 2 to 18 carbon groups and s represents the average number of moles of the oxyalkylene group represented by —($R^M$O)— as added and is a positive number of 1 to 300, inclusive].

The same as mentioned hereinabove for $R^{16}$ applies to $R^{21}$ as well.

The same as mentioned hereinabove for the oxyalkylene group represented by —($R^K$O)— in the above general formula (12) applies to the oxyalkylene group represented by —($R^M$O)— in the above general formula (16).

The group $R^M$ is the same as $R^K$ and preferably comprises the ethylene group as the majority thereof.

The oxyalkylene group —($R^M$O)— in said maleic acid/unsaturated alcohol-polyalkylene glycol adduct polymers is less susceptible to hydrolysis since said oxyalkylene group occurs in said repeating unit (P) via ether bonding.

When r is 1, said maleic acid/unsaturated alcohol-polyalkylene glycol adduct polymers are maleic acid/allyl alcohol-polyalkylene glycol adduct polymers and, when r is 2 and $R^{20}$ is a methyl group, they are maleic acid/isoprene alcohol-polyalkylene glycol adduct polymers.

In said maleic acid/allyl alcohol-polyalkylene glycol adduct polymers, $R^{20}$ is preferably a hydrogen atom since, in that case, the effects of the oxyalkylene group —($R^M$O)— can be fully produced. In the above maleic acid/allyl alcohol-polyalkylene glycol adduct polymers and maleic acid/isoprene alcohol-polyalkylene glycol adduct polymers, s is preferably 10 to 250, more preferably 20 to 200, most preferably 25 to 150, since in that case, the oxyalkylene group in repeating unit (P) in the polycarboxylic acid polymer adsorbed on cement particles can fully produce its steric repulsion effect on cement particles and contributes toward retaining cement compositions in dispersed stable.

The weight average molecular weight (Mw) of the polycarboxylic acid polymer (Y) to be used in the practice of the present invention is preferably not less than 5000. if it is less than 5000, the function of the repeating unit (L) having —COOM⁵ to cause the polycarboxylic acid polymer to be adsorbed on cement particles and the effect of the repeating unit (K) in sufficiently dispersing cement particles may not be fulfilled or produced, hence the cement dispersion maintaining effect may not fully be produced. Further, it is preferably not more than 500000. If it is higher than 500000, the polycarboxylic acid polymer (Y) may cause aggregation of cement particles and/or have an excessively high viscosity, rendering itself difficult to handle. A more preferred range is 10000 to 400000, still more preferably 15000 to 300000, in particular 18000 to 200000, most preferably 20000 to 100000.

In producing the above polycarboxylic acid polymer (Y), the production method therefor is not particularly restricted. Thus, for instance, the method of producing the polycarboxylic acid polymer for use in cement additives which comprises subjecting a monomer for forming the repeating unit (K) and a monomer for forming the repeating unit (L) having —COOM⁵ if necessary together with a monomer or monomers for forming other repeating units, to copolymerization in the conventional manner of polymerization.

The monomer for forming the above repeating unit (K) is not particularly restricted but includes, among others, esterification products from the above-mentioned alkoxypolyalkylene glycols and (meth)acrylic acid; unsaturated alcohol-(poly)alkylene oxide adducts derived from the unsaturated alcohols mentioned above by addition of 1 to 300 moles of an alkylene oxide containing 2 to 30 carbon atoms; and unsaturated alcohol-(poly) alkylene oxide adducts derived from the above unsaturated alcohol-(poly) alkylene oxide adducts by etherifying the terminal hydroxy group with a hydrocarbon group containing 1 to 30 carbon atoms. These may be used singly or two or more of them may be used combinedly.

The monomer for forming the repeating unit (L) having —COOM⁵ is not particularly restricted but includes, among others, unsaturated monobasic acids, unsaturated dibasic acids and the like, such as (meth)acrylic acid, maleic acid and maleic anhydride; univalent metal salts, bivalent metal salts, ammonium salts and organic amine salts of said unsaturated monobasic acids, unsaturated dibasic acids and the like. These may be used singly or two or more of them may be used combinedly.

The monomer for forming the other repeating unit is not particularly restricted but may be any monomer other than those monomers capable of forming the above repeating unit (K) and the above repeating unit (L) having —COOM⁵. Examples are the above-mentioned monomers capable of forming the above repeating unit (E) in the polycarboxylic acid polymer (X-1) and monomers capable of forming the other repeating unit in the polycarboxylic acid polymer (X-1). These may be used singly or two or more of them may be used combinedly.

In cases where the cement additive of the present invention contains the polycarboxylic acid polymer (Y), the oxyalkylene group of the polycarboxylic acid polymer (Y) can produce its effects with the lapse of time, since said oxyalkylene group comprising the oxyethylene groups as the major component is hardly hydrolyzable even in the alkaline cement environment at a pH of about 12. When, in this manner, the polycarboxylic acid polymer (X), which provides cement compositions with excellent dispersibility, is used in combination with the polycarboxylic acid polymer (Y), which can produce the effects of the oxyalkylene group with the lapse of time, they can synergistically exhibit very good cement dispersion maintaining ability.

A cement additive comprising, as the main component, a polymer such that a mortar containing said polymer shows a flow value of not less than 250 mm as determined using a flow cone can provide cement compositions with good fluidity at low levels of addition of water, so that the use thereof can bring about improvements in durability, workability and strength of cement compositions by means of reduction of water. The present invention, in another aspect, is concerned with such cement additive as well.

Said polymer may comprise one singly species or a combination of two or more species.

The content of the polymer in said cement additive is not particularly restricted provided that it is the main component of said additive.

In the present specification, the flow value of a mortar containing the polymer as measured using a flow cone is referred to also as "flow value (X)".

In the present specification, the term "flow cone" means the flow cone defined in JIS R 5210. The above mortar is prepared by dry mixing 800 g of Taiheiyo Ordinary Portland Cement (trademark; product of Taiheiyo Cement) and 400 g of Toyoura standard sand in a mortar mixer at a low speed of revolution for 30 seconds, then adding, to the dry mixed cement-sand mixture, 180 g of water with the polymer incorporated therein in an amount to give a solid matter content of 0.4% by weight relative to the cement weight (0.4 wt. %/cement), and kneading the resulting mixture at a high speed of revolution for 3 minutes.

Taiheiyo Ordinary Portland Cement (trademark; product of Taiheiyo Cement) shows the following properties. The values of the chemical and physical properties hereof fall in the range of those defined in JIS R5210-1997 published in 1997. That is to say, "Ordinary Portland Cement" is defined in JIS R5210-1997. In the following chemical and physical properties, the values defined in JIS R5210-1997 are indicated in parenthesis.

Density: 3.16 g/m$^3$

Specific surface area: 3310 cm$^2$/g (not less than 2500 cm$^2$/g)

Loss on ignition: 1.3% (not more than 3.0%)

Magnesium oxide: 1.4% (not more than 5.0%)

Sulfur trioxide: 2.0% (not more than 3.0%)

Chloride ion: 0.006% (not more than 0.02%)

Total alkali Na$_2$O eq %: 0.62% (not more than 0.75%)

Tricalcium silicate: 52%

Dicalcium silicate: 24%

Tricalcium aluminate: 9%

Tetracalcium iron aluminate: 9%

Toyoura standard sand is defined in JIS R$^{5201}$-1992, 10.2 published in 1992.

It is described in JIS R$^{5201}$-1992, 10.2 that the standard sand is prepared by water-washing Natural silica sand composed of not less than 90% of silicon dioxide (SiO$_2$), and drying. The standard sand defined in JIS R5201-1992, 10.2 shows the following particle size.

Retained material of a standard sieve having a mesh size of 300 μm: not more than 1%

Retained material of a standard sieve having a mesh size of 212 μm: 50±10%

Retained material of a standard sieve having a mesh size of 106 μm: not less than 95%

Said flow value (X) is the mean of the values measured lengthwise and breadwise of the diameters of the mortar that has spread on a stainless steel plate upon vertically lifting the flow cone placed on the stainless steel plate and packed with the mortar prepared from said plate.

Said polymer is not particularly restricted but includes, among others, those polycarboxylic acid polymers in which the elements thereof concerned with the flow value (X) are selected so that the requirement mentioned above may be satisfied.

Said elements concerned with the flow value (X) are not particularly restricted but include, for example, the structures of repeating units in the polymer, the average number of moles of the oxyalkylene group in the repeating unit containing the same, the proportion of occurrence of such repeating unit, the weight average molecular weight (Mw) of the polymer, and other elements concerned with the characteristics of the polymer.

A cement additive comprising, as main components, a polycarboxylic acid polymer (Q) and a polycarboxylic acid polymer (R) can show sufficient cement dispersion maintaining ability if said polycarboxylic acid polymer (Q) gives a cement setting start time of 375 to 405 minutes and said polycarboxylic acid polymer (R) gives a cement setting start time of 390 to 420 minutes with a difference of 5 to 45 minutes in cement setting start time between said polymers (Q) and (R). With such cement additive, therefore, attempts can be made to improve the durability, workability and strength of a cement composition. The present invention, in a further aspect, is concerned with such cement additive as well.

Said polycarboxylic acid polymers (Q) and (R) each may comprise one single species or a combination of two or more species.

The contents of the polycarboxylic acid polymers (Q) and (R) in the above cement additive are not particularly restricted provided that they constitute the majority of the additive.

The weight ratio between the polycarboxylic acid polymers (Q) and (R) in the above cement additive is not particularly restricted as long as the effects of the present invention can be produced.

The "cement setting start time" mentioned above, means the cement setting start time measured with a mortar containing said polycarboxylic acid polymers using a Vicat needle apparatus according to JIS R 5201. Said mortar is prepared by dry mixing 400 g of Taiheiyo Ordinary Portland Cement (trademark; product of Taiheiyo Cement) and 800 g of Toyoura standard sand in a mortar mixer at a low speed of revolution for 30 seconds, then adding, to the dry mixed cement-sand mixture, 240 g of water with the polycarboxylic acid polymers incorporated therein in an amount to give a solid matter content of 0.12% by weight relative to the cement weight (0.12 wt. %/cement), and kneading the resulting mixture at a high speed of revolution for 3 minutes.

Said polycarboxylic acid polymer (Q) and said polycarboxylic acid polymer (R) are not particularly restricted provided that the requirements mentioned above are satisfied. Thus, there may be mentioned, among others, those polycarboxylic acid polymers in which the elements thereof concerned with the cement setting start time are selected so that the requirements mentioned above may be satisfied.

Preferred as said polycarboxylic acid polymer (R) are (meth)acrylic acid/(meth)acrylic acid polyalkyleneglycol ester polymers.

The cement additive of the present invention may contain, in addition to the polymers mentioned above, an agent or agents capable of improving the dispersibility, foaming resistance and other properties of cement compositions.

The cement additive of the present invention can be used in combination with the cement dispersants in conventional use.

Said cement dispersants are not particularly restricted but include, among others, the following.

Ligninsulfonates; polyol derivatives;

naphthalenesulfonic acid-formaldehyde condensates;

melaminesulfonic acid-formaldehyde condensates;

polystyrenesulfonic acid salts; aminosulfonic acid compounds such as aminoarylsulfonic acid-phenolformaldehyde condensates, as described in JP Kokai H01-113419; cement dispersants comprising, as component (a), a copolymer of a polyalkylene glycol mono (meth)acrylate compound and a (meth)acrylic acid compound and/or a salt of said copolymer, as component (b), a copolymer of a polyalkylene glycol mono (meth)allyl ether compound and maleic anhydride and/ or a hydrolyzate of said copolymer and/or a salt thereof and, as component (c), a copolymer of a polyalkylene glycol mono(meth)allyl ether compound and the maleic acid ester of a polyalkylene glycol compound, and/or a salt thereof, as described in JP Kokai H07-267705; concrete additives comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in JP 2508113; copolymers of olyethylene (propylene) glycol (meth)acrylate or polyethylene (propylene) glycol mono(meth)allyl ether, (meth) allylsulfonic acid (or a salt thereof) and (meth)acrylic acid (or a salt thereof), as described in JP Kokai S62-216950;

copolymers of polyethylene(propylene) glycol (meth) acrylate, (meth)allylsulfonic acid (or a salt thereof) and (meth)acrylic acid (or a salt thereof), as described in JP Kokai H01-226757; copolymers comprising polyethylene(propylene) glycol (meth)acrylate, (meth) allylsulfonic acid (or a salt thereof) or p-(meth) allyloxybenzenesulfonic acid (or a salt thereof) and (meth)acrylic acid (or a salt thereof), as described in JP Kokoku H05-36377; copolymers of polyethylene glycol mono(meth)allyl ether and maleic acid (or a salt thereof), as described in JP Kokai H04-149056; copolymers of polyethylene glycol (meth)acrylate, (meth) allylsulfonic acid (or a salt thereof), (meth)acrylic acid (or a salt thereof), an alkanediol mono(meth)acrylate, a polyalkylene glycol mono(meth)acrylate and an α,β-unstated monomer having an amide group within the molecule, as described in JP Kokai H05-170501; copolymers of polyethylene glycol mono(meth)allyl ether, polyethylene glycol mono(meth)acrylate, an alkyl (meth)acrylate, (meth)acrylic acid (or a salt thereof) and (meth)allylsulfonic acid (or a salt thereof) or p-(meth)allyloxybenzenesulfonic acid (or a salt thereof), as described in JP Kokai H06-191918; copolymers of an alkoxypolyalkylene glycol monoallyl ether and maleic anhydride, or hydrolyzates thereof, or salts thereof, as described in JP Kokai H05-43288; copolymers of polyethylene glycol monoallyl ether, maleic acid and a monomer copolymerizable with these monomers, or salts thereof, or esters thereof, as described in JP Kokoku S58-38380;

copolymers of a polyalkylene glycol mono(meth)acrylate monomer, a (meth)acrylic acid monomer and a monomer copolymerizable with these monomers, as described in JP Kokoku S59-18338; copolymers comprising a sulfo-containing (meth)acrylate and a monomer coplymerizable therewith as necessary, or salts thereof, as described in JP Kokai S62-119147; esterification reaction products from a copolymer of an alkoxypolyalkylene glycol monoallyl ether and maleic anhydride and an alkenyl-terminated polyoxyalkylene derivative, as described in JP Kokai H06-271347; esterification reaction products from a copolymer of an alkoxypolyalkylene glycol monoallyl ether and maleic anhydride and a hydroxy-terminated polyoxyalkylene derivative, as described in JP Kokai H06-298555; polycarboxylic acids (or salts thereof), such as copolymers or salts thereof and like, comprising alkenyl ether monomer derived from a specific unsaturated alcohol, such as 3-methyl-3-buten-1-ol, by addition of ethylene oxide, an unsaturated carboxylic acid monomer and a monomer copolymerizable with these, as described in JP kokai S62-68806. These cement dispersing agents may be used singly or two or more of them may be used combinedly.

When such cement dispersant is used in combination, the weight ratio between the cement additive of the present invention and said cement dispersant is preferably 5/95 to 95/5, more preferably 10/90 to 90/10.

Furthermore, the cement additive of the present invention may be used in combination with one or more cement admixtures. Said other cement admixtures are not particularly restricted but include, among others, other known cement admixtures (additions) such as shown below.

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight-chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl (meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose and ribose, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid) and alkali metal salts and alkaline earth metal salts of these; and the like;

(4) Accelerators or high-early-strength agents; soluble calcium salts such as calcium chloride, calcium nitrite, calcium nitrate, calciumbromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil-based antifoaming agents; kerosene, liquid paraffin, etc.;

(6) Fat- or oil-based antifoaming agents; animal/vegetable oils, sesame oil, castor oil, alkylene oxide adducts derived from these, and the like;

(7) Fatty acid-based antifoaming agents; oleic acid, stearic acid, alkylene oxide adducts derived from these, and the like;

(8) Fatty acid ester-based antifoaming agents; glycerol monoricinolate, alkenylsuccinic acid derivatives, sorbitol monolaurate, sorbitol trioleate, natural waxes, etc.;

(9) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;

(12) Phosphate ester antifoaming agents; tributyl phosphate, sodium octyl phosphate, etc.;

(13) Metal soap antifoaming agents; aluminum stearate, calcium oleate, etc.;

(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(15) AE (air-entraining) agents; resin soaps, saturated or unsaturated fatty acids, sodium hydroxystearate, lauryl sulfate, ABSs (alkylbenzenesulfonates), LAS (linear alkylbenzenesulfonates), alkanesulfonates, polyoxyethylene alkyl(phenyl) ethers, polyoxyethylene alkyl(phenyl) ether sulfates and salts thereof, polyoxyethylene alkyl(phenyl) ether phosphates and salts thereof, proteinous materials, alkenylsulfosuccinic acids, α-olefinsulfonates, etc.;

(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(17) Water-proof agents; fatty acids (salts), fatty acid esters, fats and oils, silicones, paraffins, asphalts, waxes, etc.;

(18) Rust inhibitors; nitrite salts, phosphate salts, zinc oxide, etc.;

(19) Crack inhibitors; polyoxyalkylene alkyl ethers; alkanediols such as 2-methyl-2,4-pentanediol; etc.;

(20) Expansive admixtures; ettringite materials, coals, etc.

As other known cement admixtures (additions), there may be mentioned cement wetting agents, thickening agents, separation inhibitors, flocculants, agents to reduce shrinkage upon drying, agents to increase strength, self-leveling agents, rust inhibitors, color difference agents, antifungal agents, blast furnace slag, fly ash, cinder ash, clinker ash, husk ash, silica fume, silica powder, gypsum and so forth. These known cement admixtures may be used singly or two or more of them may be used combinedly.

The cement additive of the present invention can be used by adding to cement compositions, such as cement pastes, mortar and concrete.

Said cement compositions are not particularly restricted but include, for example, those in general use which contain cement, water, fine aggregate and coarse aggregate, among others.

Said cement is not particularly restricted but includes, among others, portland cement species, such as ordinary or normal, high-early-strength, ultra high-early-strength, moderate heat and white species; blended portland cement species such as alumina cement, fly ash cement, blast furnace cement and silica cement; and so on.

The amount of such cement species per cubic meter of concrete and the unit water content are not particularly restricted. For instance, a unit water content of 100 to 185 kg/m$^3$ and a water/cement ratio of 10 to 70% are preferred. More preferred are a unit water content of 120 to 175 kg/m$^3$ and a water/cement ratio of 20 to 65%.

The method of addition and the level of addition of the cement additive of the present invention are not particularly restricted. As for the addition level, it is preferred that the polymer of the present invention amount to 0.01 to 10% by weight relative to the total cement weight. When it is lower than 0.01% by weight, the cement composition may be poor in dispersibility. An addition level in excess of 10% by weight is economically disadvantageous. The percent values mentioned above are on the solid basis.

Cement compositions containing the cement additive of the present invention as added thereto show sufficient dispersibility and are excellent in fluidity, so that attempts can successfully be made to improve the workability, durability and strength of the cement compositions by water reduction.

Further, since the amount of water to be added is small and adequate air entraining properties can be obtained, it is possible to obtained cured or hardened cement products or structures having stable strength and excellent durability.

The invention, in a further aspect, is concerned with such a cement composition as well.

The polycarboxylic acid polymer of the present invention is a polycarboxylic acid polymer, which has; a repeating unit (G) represented by the general formula (8) given hereinabove, a repeating unit (H) represented-by the general formula (9) given hereinabove, a repeating unit (I) represented by the general formula (10) given hereinabove and a repeating unit (J) represented by the general formula (11) given hereinabove, in which none of $S2$ and $E3$ is equal to 0 (zero) and n is not less than 110.

Said polycarboxylic acid polymer is effective in dispersing cement particles; inorganic powders and pigments, among others.

Said inorganic pigments are not particularly restricted but include, among others, silicate salts such as kaolin, aluminum silicate, clay, talc, mica, asbestos powder, calcium silicate, sericite and bentonite; carbonate salts such as calcium carbonate, magnesium carbonate, barium carbonate and dolomite; sulfate salts such as calcium sulfate and barium sulfate; metal oxides such as magnesia, alumina, antimony trioxide, antimony pentaoxide, titanium oxide, white carbon, diatomaceous earth and iron oxide; metal hydroxides such as aluminum hydroxide, magnesium hydroxide and iron hydroxide; and so forth. Mention may further be made of silicon carbide, silicon nitride, boron nitride, zirconia, barium titanate, satin white and the like. These may be used singly or in combination.

In the above polycarboxylic acid polymer, the repeating unit (G) is the same as that repeating unit (A) in the polycarboxylic acid polymer (X) mentioned hereinabove in which $R^3$ is —$OR^4$, the repeating unit (H) is the same as the repeating unit (B) mentioned hereinabove, the repeating unit (I) is the same as the repeating unit (C) mentioned hereinabove and the repeating unit (J) is the same as the repeating unit (D) mentioned hereinabove.

Unless the effects of the present invention are impaired, the above polycarboxylic acid polymer may comprise some other repeating unit [the proportion of occurrence (mole ratio) of said repeating unit is represented by S2'].

Said other repeating unit is other than the repeating unit (A) where $R^3$ is —$OR^4$, as mentioned hereinabove, and is the same as the other repeating unit in the polycarboxylic acid polymer (X) mentioned hereinabove.

In the above polycarboxylic acid polymer, the repeating units (G), (H), (I) and (J) and the other repeating unit each may comprise one single species or two or more species.

In said polycarboxylic acid polymer, the repeating units (G), (H), (I) and (J) and the other repeating unit each may be of any mode of addition, for example of the random, block or alternating addition mode.

In said polycarboxylic acid polymer, the sum S2+T2+E3+E4+S2' is equal to 1.

In said polycarboxylic acid polymer, neither of S2 and E3 is equal to 0 (zero). Therefore, said polycarboxylic acid polymer always has the above-mentioned repeating units (G) and (I) and may have at least one of the above-mentioned repeating units (H) and (J) and the above-mentioned other repeating unit or may have none of these.

The number n for the oxyalkylene group in said repeating unit (I) is not less than 110. When it is smaller than 110, the oxyalkylene group in the repeating unit (I) in the polycarboxylic acid polymer will not fully produce the steric repulsion effect on cement particles, inorganic powders and pigments, so that said polymer provides the cement particles, inorganic powders and pigments only with poor dispersibility. Considering the oxyalkylene group preparation becoming difficult, n is preferably not more than 300. A more preferred range is 120 to 250, still more preferably 130 to 200, most preferably 140 to 180.

That the oxyalkylene group in said repeating unit (I) comprises the ethylene group as the major component and that n is not less than 110 synergistically allow said polymer to fulfill its function to cause cement particles, inorganic powder particles and pigment particles to repulse from one another.

The relation among S2, T2, E3, E4 and S2' for the above polycarboxylic acid polymer is preferably the same as S1,T1,E1,E2 and S1' for the polycarboxylic acid polymer (X) as mentioned hereinabove. It is also preferred that the weight average molecular weight (Mw) of said polycarboxylic acid polymer be the same as that of the polycarboxylic acid polymer (X) as mentioned hereinabove.

In producing the polycarboxylic acid polymer, the production method is not particularly restricted. For instance, the same production methods as in producing the polycarboxylic acid polymer (X) as mentioned hereinabove can be applied.

The polycarboxylic acid polymer of the present invention is excellent in the ability to disperse cement particles; inorganic powders and pigments and other ingredients and has no coloration problem, hence can judiciously be used as a cement additive; dispersant for inorganic pigments for paper coating; dispersant for paper loading pigments, dispersant for water paint pigments, dispersant for water ink pigments or the like dispersant; builder for detergents; scale inhibitor, etc.

BEST MODES FOR CARRYING OUT THE INVENTION

The following examples illustrate the present invention in further detail. They are, however, by no means limitative of the scope of the present invention.

In the examples, the weight average molecular weight (Mw) of each polymer was determined under the conditions shown below.

Apparatus; Millenium System (trademark; product of Waters);

Detector; 410RI detector (trademark; product of Waters);

Column; TSK-GEL G4000SWXL, TSK-GEL G3000SWXL or TSK-GEL 2000SWXL (all trademarks; product of Tosoh Corp.); one each of G4000, G3000 and G2000 connected in series;

Eluent; Solution composed of 1765 g of acetonitrile, 3235 g of water and 34 g of sodium acetate trihydrate; adjusted to pH 6.0 with acetic acid;

Flow rate; 1.0 ml/min;

Temperature; 25° C.;

Standard samples; Polyethylene glycol species having weight average molecular weights (Mw) of 170000, 85000, 46000, 26000, 12600 and 7100, respectively.

Synthesis of an Ethyl Vinyl Ether-maleic Anhydride Copolymer (1)

A glass reactor equipped with thermometer, stirrer, nitrogen inlet tube and reflux condenser was charged with 35 g of maleic anhydride, 26 g of ethyl vinyl ether and 613 g of methyl ethyl ketone, the reactor inside temperature was then raised to 70° C. to effect dissolution of the maleic anhydride. Then, a solution of 0.1 g of 2,2'-azobis(isobutyronitrile) in 3 g of methyl ethyl ketone was added all at once, and the reaction was allowed to proceed at 70° C. for 6 hours. After completion of the reaction, the methyl ethyl ketone was distilled off to give an ethyl vinyl ether-maleic anhydride copolymer (1) with a weight average molecular weight (Mw) of 28000.

Synthesis of an Ethyl Vinyl Ether-maleic Anhydride Copolymer (2)

A glass reaction vessel equipped with thermometer, stirrer, dropping funnels, nitrogen inlet tube and reflux condenser was charged with 106.6 g of ethyl vinyl ether and 494.5 g of tetrahydrofuran, the reactor was purged with nitrogen with stirring and heated to 60° C. in a nitrogen atmosphere. Then, a solution composed of 2.9 g of 2,2'-azobis(isobutyronitrile), 106.6 g of ethyl vinyl ether and 106.6 g of tetrahydrofuran and a solution of 290 g of maleic anhydride in 580 g of tetrahydrofuran were each added dropwise to the reactor over 2 hours. Thereafter, the temperature of 60° C. was maintained for 2.5 hours to drive the polymerization reaction to completion, and the tetrahydrofuran was then distilled off under reduced pressure to give an ethyl vinyl ether-maleic anhydride copolymer (2) with a weight average molecular weight (Mw) of 20000.

SYNTHESIS EXAMPLES 1 TO 5

A glass reaction vessel equipped with thermometer, stirrer, dropping funnel, nitrogen inlet tube and reflux condenser was charged with the specified amount (see Table 1) of the specified ethyl vinyl ether-maleic anhydride copolymer species (see Table 1) and 20 g of dehydrated tetrahydrofuran to effect dissolution of the ethyl vinyl ether-maleic anhydride copolymer. Then, a methoxypolyethylene glycol alkoxide solution (Synthesis Example 1, 2, 3 or 5) or a butoxypolypropylene glycol alkoxide solution (Synthesis Example 4) separately prepared by adding the specified amount (see Table 1) of sodium hydride to a solution of the specified amount (see Table 1) of the specified polyalkylene glycol species (see Table 1) in 20 g of tetrahydrofuran was added dropwise to the reactor at room temperature. After completion of the dropping, the reaction was allowed to proceed for 24 hours while maintaining the reaction temperature at 55° C. Thereafter, the tetrahydrofuran was distilled off using an evaporator and then water and a 30% aqueous solution of sodium hydroxide were added to thereby adjust the solution to pH 7.0. In this manner, polycarboxylic acid polymers (1) to (5) were obtained. The values of n, m, na, S1, T1, E1 and E2 for each of the polycarboxylic acid polymers obtained and the weight average molecular weight (Mw) thereof are shown in Table 1.

COMPARATIVE SYNTHESIS EXAMPLE 1

The same glass reaction vessel as used in Synthesis Examples 1 to 5 was charged with 4 g of the ethyl vinyl ether-maleic anhydride copolymer (1) and 13 g of dehydrated tetrahydrofuran to effect dissolution of the ethyl vinyl ether-maleic anhydride copolymer (1). Then, a methoxypolyethylene glycol alkoxide solution separately prepared by adding 0.068 g of sodium hydride to a solution of 2.7 g of methoxypolyethylene glycol (average number of moles of ethylene oxide added; 25) in 13 g of dehydrated tetrahydrofuran was added dropwise into the reactor at room temperature. After completion of the dropping, the reaction was allowed to proceed for 24 hours while maintaining the reaction temperature at 55° C. Thereafter, the reaction mixture was treated in the same manner as in Synthesis Examples 1 to 5 to give a comparative polycarboxylic acid polymer (1). The values of n, m, na, S1, T1, E1 and E2 for the polycarboxylic acid polymer (1) obtained and the weight average molecular weight (Mw) thereof are shown in Table 1.

COMPARATIVE SYNTHESIS EXAMPLE 2

The same glass reaction vessel as used in Synthesis Examples 1 to 5 was charged with 4 g of the ethyl vinyl ether-maleic anhydride copolymer (1) and 40 g of dehydrated tetrahydrofuran to effect dissolution of the ethyl vinyl ether-maleic anhydride copolymer (1). Then, a methoxypolyethylene glycol alkoxide solution separately prepared by adding 0.41 g of sodium hydride to a solution of 16 g of methoxypolyethylene glycol (average number of moles of ethylene oxide added; 25) in 40 g of dehydrated tetrahydrofuran was added dropwise to the reactor at room temperature. After completion of the dropping, the reaction was allowed to proceed for 24 hours while maintaining the reaction temperature at 55° C. Thereafter, the reaction mixture was treated in the same manner as in Synthesis Examples 1 to 5 to give a comparative polycarboxylic acid polymer (2). The values of n, m, na, S1, T1, E1 and E2 for the polycarboxylic acid polymer (2) obtained and the weight average molecular weight (Mw) thereof are shown in Table 1.

TABLE 1

|  |  | Synthesis example 1 Polycarboxylic acid polymer (1) | Synthesis example 2 Polycarboxylic acid polymer (2) | Synthesis example 3 Polycarboxylic acid polymer (3) | Synthesis example 4 Polycarboxylic acid polymer (4) |
|---|---|---|---|---|---|
| Mw of ethyl vinyl ether/maleic anhydride copolymer subjected to reaction |  | 28000 | 28000 | 20000 | 20000 |
| Reactant weight (g) | Ethyl vinyl ether/maleic anhydride copolymer (1) | 2.5 | 2.0 | — | — |
|  | Ethyl vinyl ether/maleic anhydride copolymer (2) | — | — | 2.0 | 2.0 |
|  | Methoxypolyethylene glycol (115) | 7.5 | — | — | — |
|  | Methoxypolyethylene glycol (150) | — | 7.8 | 7.8 | 7.8 |
|  | Methoxypolyethylene glycol (25) | — | — | — | — |
|  | Butoxypolyethylene glycol (20) | — | — | — | 0.3 |
|  | Sodium hydride | 0.043 | 0.034 | 0.043 | 0.05 |
| Average number of moles of oxyalkylene group added in polyalkylene glycol | n | 115 | 150 | 150 | 150 |
|  | m | — | — | — | 20 |
|  | na | 115 | 150 | 150 | 128 |
| Characteristics of polymer | Proportion of occurrence of repeating unit in polycarboxylic acid polymer (mole ratio) | | | | |
|  | S1 | 0.50 | 0.50 | 0.50 | 0.50 |
|  | T1 | 0.45 | 0.45 | 0.45 | 0.44 |
|  | E1 | 0.05 | 0.05 | 0.05 | 0.05 |
|  | E2 | 0.00 | 0.00 | 0.00 | 0.01 |
|  | E1/(E1 + E2) | — | — | — | 0.83 |
|  | E1/(T1 + E1) | 0.10 | 0.10 | 0.10 | 0.10 |

TABLE 1-continued

| | | Weight average molecular weight (Mw) | 67100 | 132200 | 83000 | 78000 |
|---|---|---|---|---|---|---|

| | | | Synthesis example 5 Polycarboxylic acid polymer (5) | Comparative synthesis example 1 Comparative polycarboxylic acid polymer (1) | Comparative synthesis example 2 Comparative polycarboxylic acid polymer (2) |
|---|---|---|---|---|---|
| Mw of ethyl vinyl ether/maleic anhydride copolymer subjected to reaction | | | 20000 | 28000 | 28000 |
| Reactant weight (g) | | Ethyl vinyl ether/maleic anhydride copolymer (1) | — | 4.0 | 4.0 |
| | | Ethyl vinyl ether/maleic anhydride copolymer (2) | 2.0 | — | — |
| | | Methoxypolyethylene glycol (115) | — | — | — |
| | | Methoxypolyethylene glycol (150) | 5.5 | — | — |
| | | Methoxypolyethylene glycol (25) | — | 2.7 | 16.0 |
| | | Butoxypolyethylene glycol (20) | — | — | — |
| | | Sodium hydride | 0.03 | 0.068 | 0.41 |
| Average number of moles of oxyalkylene group added in polyalkylene glycol | | n | 150 | 25 | 25 |
| | | m | — | — | — |
| | | na | 150 | 25 | 25 |
| Characteristics of polymer | Proportion of occurrence of repeating unit in polycarboxylic acid polymer (mole ratio) | S1 | 0.50 | 0.50 | 0.50 |
| | | T1 | 0.47 | 0.45 | 0.20 |
| | | E1 | 0.03 | 0.05 | 0.30 |
| | | E2 | 0.00 | 0.00 | 0.00 |
| | | E1/(E1 + E2) | — | — | — |
| | | E1/(T1 + E1) | 0.06 | 0.10 | 0.60 |
| | Weight average molecular weight (Mw) | | 72000 | 58000 | 59000 |

In Table 1, methoxypolyethylene glycol (115), methoxypolyethylene glycol (150) and methoxypolyethylene glycol (25) mean methoxypolyethylene glycol species in which the average number of moles of ethylene oxide added is 115, 150 or 25, respectively. Butoxypolypropylene glycol (20) means a butoxypolypropylene glycol species in which the average number of moles of propylene oxide added is 20.

Synthesis of a Polycarboxylic Acid Dispersant (PC1)

The same glass reaction vessel as used in Synthesis Examples 1 to 5 was charged with 2425 g of water, the reactor was purged with nitrogen with stirring and heated to 95° C. in a nitrogen atmosphere. Then, a mixed solution composed of 790 g of methoxypolyethylene glycol monomethacrylate (the average number of moles of ethylene oxide added being 10), 189 g of methacrylic acid, 26 g of sodium methacrylate and 1500 g of water and 75 g of a 10% aqueous solution of ammonium persulfate were each added dropwise over 4 hours. After completion of the dropping, 20 g of a 10% aqueous solution of ammonium persulfate was further added dropwise over 1 hour. Thereafter, the reaction was allowed to proceed for 1 hour while maintaining the reaction temperature at 95° C. After the polymerization was thus completed, the reaction mixture was neutralized with a 30% aqueous solution of sodium hydroxide, to give a polycarboxylic acid dispersant (PC1) with a weight average molecular weight (Mw) of 35000.

Synthesis of a Polycarboxylic Acid Dispersant (PC2)

The same glass reaction vessel as used in Synthesis Examples 1 to 5 was charged with 50 g of an unsaturated alcohol prepared by adding 35 moles, on average, of ethylene oxide to 3-methyl-3-buten-1-ol, 6.4 g of maleic acid and 24.2 g of water, and the contents were heated to 60° C. with stirring. Then, 14.3 g of a 6% aqueous solution of ammonium persulfate was added dropwise over 3 hours. Thereafter, the reaction was allowed to proceed for 1 hour while maintaining the reaction temperature at 60° C. After the reaction was thus driven to completion, the reaction mixture was neutralized with a 30% aqueous solution of sodium hydroxide, to give a polycarboxylic acid dispersant (PC2) with a weight average molecular weight (Mw) of 33400.

EXAMPLE 1

Taiheiyo ordinary portland cement (product of Taiheiyo Cement; 600 g) and 600 g of Toyoura standard sand were dry-mixed in a mortar mixer (trademark: N-50; product of Tesco) at a low speed of revolution for 30 seconds. Then, 210 g of water with each polycarboxylic acid polymer specified in Table 2 incorporated therein was added to the dry mixed cement-sand mixture and the whole mixture was kneaded at a high speed of revolution for 3 minutes. In this manner, each of mortars (1) to (15) was prepared. The polycarboxylic acid polymer was incorporated in an amount such that the weight percentage of the solid relative to the cement weight amounted to the respective value given in Table 2. In preparing the mortars, care was taken so that the dry mixing and kneading conditions in the mortar mixer might remain identical.

The mortars (1) to (15) obtained were evaluated by the methods shown below. The results are shown in Table 2.

Evaluation Methods (1) Mortar Homogenization Time

Water (210 g) with the polycarboxylic acid polymer incorporated therein was added to the dry mixed cement-sand mixture and the mixture was kneaded at a high speed of revolution for 3 minutes. The time (in seconds) required for the mortar to reach a homogeneous state was determined by the eye and recorded as the mortar homogenization time.

(2) Flow Value (Y)

Five minutes after pouring of water, the mortar prepared was packed into a hollow cylindrical vessel having a diameter of 55 mm and a height of 50 mm as placed on a table and then this hollow cylindrical vessel was lifted vertically. The mortar that had spread over the table was measured for diameter in two crosswise directions. The mean of the two diameter values was recorded as the flow value (Y) [mm]. A higher flow value indicates higher mortar fluidity.

(3) Amount of Entrained Air

A volume of 500 ml of the mortar prepared was weighed and the amount of entrained air (% by volume) was calculated using the specific gravity of the whole material used.

TABLE 2

| | | Example 1 | | | | | | | |
|---|---|---|---|---|---|---|---|---|---|
| | | Mortar (1) | Mortar (2) | Mortar (3) | Mortar (4) | Mortar (5) | Mortar (6) | Mortar (7) | Mortar (8) |
| Polymer solids weight % relative to cement weight (wt. %/cement) | Polycarboxylic acid polymer (1) | 0.15 | 0.075 | 0.075 | — | — | — | — | — |
| | Polycarboxylic acid polymer (2) | — | — | — | 0.15 | 0.075 | 0.075 | — | — |
| | Polycarboxylic acid polymer (3) | — | — | — | — | — | — | 0.15 | 0.075 |
| | Polycarboxylic acid polymer (4) | — | — | — | — | — | — | — | — |
| | Polycarboxylic acid polymer (5) | — | — | — | — | — | — | — | — |
| | Polycarboxylic acid dispersant (PC1) | — | 0.075 | — | — | 0.075 | — | — | 0.075 |
| | Polycarboxylic acid dispersant (PC2) | — | — | 0.075 | — | — | 0.075 | — | — |
| Total polymer solids weight % relative to cement weight (wt. %/cement) | | 0.15 | 0.15 | 0.15 | 0.15 | 0.15 | 0.15 | 0.15 | 0.15 |
| Mortar homogenization time (sec.) | | 25 | 25 | 35 | 20 | 20 | 30 | 20 | 20 |
| Flow value (Y) [mm] | | 95 | 90 | 87 | 132 | 125 | 115 | 175 | 165 |
| Amount of entrained air (vol. %) | | 11.6 | 12.7 | 11.9 | 15.6 | 16.6 | 13.6 | 16.0 | 15.2 |

| | | Example 1 | | | | | | |
|---|---|---|---|---|---|---|---|---|
| | | Mortar (9) | Mortar (10) | Mortar (11) | Mortar (12) | Mortar (13) | Mortar (14) | Mortar (15) |
| Polymer solids weight % relative to cement weight (wt. %/cement) | Polycarboxylic acid polymer (1) | — | — | — | — | — | — | — |
| | Polycarboxylic acid polymer (2) | — | — | — | — | — | — | — |
| | Polycarboxylic acid polymer (3) | 0.075 | — | — | — | — | — | — |
| | Polycarboxylic acid polymer (4) | — | 0.15 | 0.075 | 0.075 | — | — | — |
| | Polycarboxylic acid polymer (5) | — | — | — | — | 0.15 | 0.075 | 0.075 |
| | Polycarboxylic acid dispersant (PC1) | 0.075 | — | 0.075 | — | — | 0.075 | — |
| | Polycarboxylic acid dispersant (PC2) | — | — | — | 0.075 | — | — | 0.075 |
| Total polymer solids weight % relative to cement weight (wt. %/cement) | | 0.15 | 0.15 | 0.15 | 0.15 | 0.15 | 0.15 | 0.15 |
| Mortar homogenization time (sec.) | | 30 | 20 | 20 | 30 | 30 | 30 | 35 |
| Flow value (Y) [mm] | | 160 | 165 | 160 | 145 | 150 | 150 | 145 |
| Amount of entrained air (vol. %) | | 17.0 | 4.2 | 8.4 | 9.5 | 14.7 | 15.8 | 16.1 |

COMPARATIVE EXAMPLE 1

Comparative mortars (1) and (2) were prepared in the same manner as in Example 1 except that the comparative polycarboxylic acid polymer specified in Table 2 was used as the polycarboxylic acid polymer species for mortar preparation and the amount thereof (percentage of solids weight relative to cement weight) was as shown in Table 2.

The comparative mortars (1) and (2) obtained were evaluated by the same methods as mentioned in Example 1. The results are shown in Table 3.

TABLE 3

|  | Comparative example 1 | |
|---|---|---|
|  | Comparative mortar (1) | Comparative mortar (2) |
| Polymer solids weight % relative to cement weight (wt. %/cement) | | |
| Comparative polycarboxylic acid polymer (1) | 0.15 | — |
| Comparative polycarboxylic acid polymer (2) | — | 0.15 |
| Total polymer solids weight % relative to cement weight (wt. %/cement) | 0.15 | 0.15 |
| Mortar homogenization time (sec.) | 60 | 120 |
| Flow value (Y) [mm] | 65 | 90 |
| Amount of entrained air (vol. %) | 8.6 | 10.5 |

As is evident from Table 2 and Table 3, the mortars (1) to (15) in which the polycarboxylic acid polymers (1) to (5) were used each showed a mortar homogenization time of not longer than 35 seconds and proved to be superior in this respect to the comparative mortars (1) and (2) in which the comparative polycarboxylic acid polymers (1) and (2) were used. It was thus revealed that when, in the repeating unit (C), n is not less than 110, increased hydrophilicity can be attained and this is advantageous in providing cement particles with wettability, which is important to mortar kneading performances.

The mortars (1), (4), (7), (10) and (13) in which the polycarboxylic acid polymers (1) to (5) were used each in an amount of 0.15% by weight (as solids) relative to the cement weight showed flow values (Y) of 95 mm, 132 mm, 175 mm, 165 mm and 150 mm, respectively, indicating quite sufficient fluidity as compared with the comparative mortars (1) and (2). In particular, the mortars in which the polycarboxylic acid polymers (3) to (5) prepared by using an ethyl vinyl ether-maleic anhydride copolymer having a weight average molecular weight (Mw) of 20000 each showed an increased flow value (Y), indicating excellent fluidity.

Synthesis of a Styrene-maleic Anhydride Copolymer (1)

The same glass reaction vessel as used in Synthesis Examples 1 to 5 was charged with 36.8 g of maleic anhydride, 1.35 g of 3-mercaptopropionic acid and 174 g of methyl ethyl ketone. The reactor was purged with nitrogen with stirring and heated to 80° C. in a nitrogen atmosphere. Then, a monomer solution composed of 1.59 g of 2,2'-azobis (isobutyronitrile) and 39.5 g of styrene was added dropwise into the reactor over 1 hour. The polymerization was driven to completion by maintaining the temperature at 80° C. for 2.5 hours. Thereafter, the methyl ethyl ketone was distilled off under reduced pressure, to give a styrene-maleic anhydride copolymer (1) with a weight average molecular weight (Mw) of 16800.

SYNTHESIS EXAMPLES 6 TO 9

The same glass reaction vessel as used in Synthesis Examples 1 to 5 was charged with the amount specified in Table 4 of the styrene-maleic anhydride copolymer specified in Table 4 and 20 g of dehydrated tetrahydrofuran to effect dissolution of said polymer. Then, a methoxypolyethylene glycol alkoxide solution separately prepared by adding 0.04 g of sodium hydride to a solution of the amount specified in Table 4 of the polyalkylene glycol specified in Table 4 in 20 g of dehydrated tetrahydrofuran was added dropwise into the reactor at room temperature. After completion of the dropping, the reaction was allowed to proceed for 24 hours while maintaining the reaction temperature at 55° C. Thereafter, the reaction mixture was treated in the same manner as in Synthesis Examples 1 to 5. This procedure gave polycarboxylic acid polymers (6) to (9). The values of n, m, na, S1, T1, E1 and E2 for each of the polymers obtained and the weight average molecular weight (Mw) thereof are shown in Table 4.

COMPARATIVE SYNTHESIS EXAMPLES 3 TO 5

Comparative polymers (3) to (5) were obtained in the same manner as in Synthesis Examples 6 to 9 except that those species and amount of polyalkylene glycol and that amount of sodium hydride which are shown in Table 4 were used. The values of n, m, na, S1, T1, E1 and E2 for each of the polymers obtained and the weight average molecular weight (Mw) thereof are shown in Table 4.

TABLE 4

| | | Synthesis example 6 Polycarboxylic acid polymer (6) | Synthesis example 7 Polycarboxylic acid polymer (7) | Synthesis example 8 Polycarboxylic acid polymer (8) | Synthesis example 9 Polycarboxylic acid polymer (9) |
|---|---|---|---|---|---|
| Mw of styrene/maleic anhydride copolymer subjected to reaction | | 10000 | 10000 | 16800 | 16800 |
| Reactant weight (g) | SMA-1000P (trademark) | 2.5 | 2.5 | — | — |
| | Styrene/maleic anhydride copolymer (1) | — | — | 2.5 | 2.5 |
| | Methoxypolyethylene glycol (150) | 8.0 | 8.0 | 8.0 | 8.0 |
| | Methoxypolyethylene glycol (25) | — | — | — | — |
| | Butoxypolypropylene glycol (20) | — | 0.3 | — | 0.3 |
| | Sodium hydride | 0.04 | 0.04 | 0.04 | 0.04 |
| Average number of moles of oxyalkylene | n | 150 | 150 | 150 | 150 |
| | m | — | 20 | — | 20 |

TABLE 4-continued

|  |  |  |  |  |  |  |
|---|---|---|---|---|---|---|
| group added in polyalkylene glycol |  | na | 150 | 128 | 150 | 128 |
| Characteristics of polymer | Proportion of occurrence of repeating unit in polycarboxylic acid polymer (mole ratio) | S1 | 0.50 | 0.50 | 0.50 | 0.50 |
|  |  | T1 | 0.45 | 0.44 | 0.45 | 0.44 |
|  |  | E1 | 0.05 | 0.05 | 0.05 | 0.05 |
|  |  | E2 | 0.00 | 0.01 | 0.00 | 0.01 |
|  | E1/(E1 + E2) |  | — | 0.83 | — | 0.83 |
|  | E1/(T1 + E1) |  | 0.10 | 0.10 | 0.10 | 0.10 |
|  | Weight average molecular weight (Mw) |  | 30000 | 44000 | 83500 | 85600 |

|  |  |  | Comparative synthesis example 3 Comparative polycarboxylic acid polymer (3) | Comparative synthesis example 4 Comparative polycarboxylic acid polymer (4) | Comparative synthesis example 5 Comparative polycarboxylic acid polymer (5) |
|---|---|---|---|---|---|
| Mw of styrene/maleic anhydride copolymer subjected to reaction |  |  | 10000 | 10000 | 10000 |
| Reactant weight (g) |  | SMA-1000P (trademark) | 2.5 | 2.5 | 2.5 |
|  |  | Styrene/maleic anhydride copolymer (1) | — | — | — |
|  |  | Methoxypolyethylene glycol (150) | — | — | — |
|  |  | Methoxypolyethylene glycol (25) | 12.4 | 8.3 | 4.2 |
|  |  | Butoxypolypropylene glycol (20) | — | — | — |
|  |  | Sodium hydride | 0.40 | 0.25 | 0.11 |
| Average number of moles of oxyalkylene group added in polyalkylene glycol |  | n | 25 | 25 | 25 |
|  |  | m | — | — | — |
|  |  | na | 25 | 25 | 25 |
| Characteristics of polymer | Proportion of occurrence of repeating unit in polycarboxylic acid polymer (mole ratio) | S1 | 0.50 | 0.50 | 0.50 |
|  |  | T1 | 0.05 | 0.20 | 0.35 |
|  |  | EI | 0.45 | 0.30 | 0.15 |
|  |  | E2 | 0.00 | 0.00 | 0.00 |
|  | E1/(E1 + E2) |  | — | — | — |
|  | E1/(T1 + E1) |  | 0.90 | 0.60 | 0.30 |
|  | Weight average molecular weight (Mw) |  | 19500 | 18300 | 16100 |

In Table 4, "SMA-1000P" (trademark) is a styrene-maleic anhydride copolymer produced by Elf Atochem. The styrene-maleic acid sodium salt polymer derived from SMA-1000P (trademark) by treatment with sodium hydroxide had a weight average molecular weight (Mw) of 10000.

Synthesis of a Polycarboxylic Acid Dispersant (PC3)

A polycarboxylic acid dispersant with a weight average molecular weight (Mw) of 63000 (PC3) was prepared in the same manner as in Synthesis Example 1 except that 2.5 g of SMA-1000P (trademark) was used in lieu of 2 g of the ethyl vinyl ether-maleic anhydride copolymer, that 7.8 g of methoxypolyethylene glycol (150) was used as the polyalkylene glycol and that sodium hydride was used in an amount of 0.034 g in lieu of 0.04 g.

EXAMPLE 2

Mortars (16) to (35) were prepared in the same manner as in Example 1 except that the polycarboxylic acid polymer specified in Table 5 or 6 was used as the polycarboxylic acid polymer species for mortar preparation and the amount thereof (percentage of solids weight relative to cement weight) was as shown in Table 5 or 6 and that the cement species used was Taiheiyo ordinary portland cement (product of Taiheiyo Cement).

The mortars (16) to (35) thus obtained were evaluated for flow value (Y) and amount of entrained air by the methods mentioned above in Example 1. The results are shown in Table 5 and Table 6.

TABLE 5

|  |  | Example 2 |  |  |  |  |  |  |
|---|---|---|---|---|---|---|---|---|
|  |  | Mortar (16) | Mortar (17) | Mortar (18) | Mortar (19) | Mortar (20) | Mortar (21) | Mortar (22) |
| Polymer solids weight % | Polycarboxylic acid polymer (6) | 0.2 | 0.065 | 0.1 | 0.09 | 0.1 | 0.09 | 0.1 |

TABLE 5-continued

|  |  | | | | | | | |
|---|---|---|---|---|---|---|---|---|
| relative to cement weight (wt. %/cement) | Polycarboxylic acid polymer (7) | — | — | — | — | — | — | — |
|  | Polycarboxylic acid dispersant (PC1) | — | 0.065 | 0.1 | — | — | — | — |
|  | Polycarboxylic acid dispersant (PC2) | — | — | — | 0.09 | 0.1 | — | — |
|  | Polycarboxylic acid dispersant (PC3) | — | — | — | — | — | 0.09 | 0.1 |
| Total polymer solids weight % relative to cement weight (wt. %/cement) | | 0.2 | 0.13 | 0.2 | 0.18 | 0.2 | 0.18 | 0.2 |
| Flow value (Y) [mm] | | 90 | 92 | 122 | 95 | 102 | 114 | 118 |
| Amount of entrained air (vol. %) | | 31.8 | 19.5 | 20.6 | 28.6 | 29.9 | 33.9 | 35.1 |

|  |  | Example 2 | | | | | | |
|---|---|---|---|---|---|---|---|---|
|  |  | Mortar (23) | Mortar (24) | Mortar (25) | Mortar (26) | Mortar (27) | Mortar (28) | Mortar (29) |
| Polymer solids weight % relative to cement weight (wt. %/cement) | Polycarboxylic acid polymer (6) | — | — | — | — | — | — | — |
|  | Polycarboxylic acid polymer (7) | 0.2 | 0.065 | 0.1 | 0.09 | 0.1 | 0.08 | 0.1 |
|  | Polycarboxylic acid dispersant (PC1) | — | 0.065 | 0.1 | — | — | — | — |
|  | Polycarboxylic acid dispersant (PC2) | — | — | — | 0.09 | 0.1 | — | — |
|  | Polycarboxylic acid dispersant (PC3) | — | — | — | — | — | 0.08 | 0.1 |
| Total polymer solids weight % relative to cement weight (wt. %/cement) | | 0.2 | 0.13 | 0.2 | 0.18 | 0.2 | 0.16 | 0.2 |
| Flow value (Y) [mm] | | 92 | 90 | 120 | 85 | 99 | 91 | 108 |
| Amount of entrained air (vol. %) | | 4.7 | 5.6 | 4.9 | 4.8 | 4.7 | 4.2 | 4.5 |

TABLE 6

|  |  | Example 2 | | | | | |
|---|---|---|---|---|---|---|---|
|  |  | Mortar (30) | Mortar (31) | Mortar (32) | Mortar (33) | Mortar (34) | Mortar (35) |
| Polymer solids weight % relative to cement weight (wt. %/cement) | Polycarboxylic acid polymer (8) | 0.2 | 0.1 | 0.1 | — | — | — |
|  | Polycarboxylic acid polymer (9) | — | — | — | 0.2 | 0.1 | 0.1 |
|  | Polycarboxylic acid dispersant (PC1) | — | 0.1 | — | — | 0.1 | — |
|  | Polycarboxylic acid dispersant (PC2) | — | — | 0.1 | — | — | 0.1 |
| Total polymer solids weight % relative to cement weight (wt. %/cement) | | 0.2 | 0.2 | 0.2 | 0.2 | 0.2 | 0.2 |
| Flow value (Y) [mm] | | 132 | 142 | 135 | 123 | 135 | 124 |
| Amount of entrained air (vol. %) | | 32.5 | 20.5 | 23.6 | 5.2 | 6.7 | 6.3 |

COMPARATIVE EXAMPLE 2

Comparative mortars (3) to (8) were prepared in the same manner as in Example 2 except that the polycarboxylic acid polymer specified in Table 7 was used as the polycarboxylic acid polymer species for mortar preparation and the amount thereof (percentage of solids weight relative to cement weight) was as shown in Table 7.

The comparative mortars (3) to (8) thus obtained were evaluated for flow value (Y) and amount of entrained air by the methods mentioned above in Example 1. The results are shown in Table 7.

TABLE 7

|  |  | Comparative Example 2 | | | | | |
|---|---|---|---|---|---|---|---|
|  |  | Comparative mortar (3) | Comparative mortar (4) | Comparative mortar (5) | Comparative mortar (6) | Comparative mortar (7) | Comparative mortar (8) |
| Polymer solids weight % | Comparative polycarboxylic acid | 0.2 | 0.4 | — | — | — | — |

TABLE 7-continued

|  |  | Comparative Example 2 | | | | | |
|---|---|---|---|---|---|---|---|
|  |  | Comparative mortar (3) | Comparative mortar (4) | Comparative mortar (5) | Comparative mortar (6) | Comparative mortar (7) | Comparative mortar (8) |
| relative to cement weight (wt. %/cement) | polymer (3) Comparative polycarboxylic acid polymer (4) | — | — | 0.2 | 0.4 | — | — |
|  | Comparative polycarboxylic acid polymer (5) | — | — | — | — | 0.2 | 0.6 |
| Total polymer solids weight % relative to cement weight (wt. %/cement) |  | 0.2 | 0.4 | 0.2 | 0.4 | 0.2 | 0.6 |
| Flow value (Y) [mm] |  | 61 | 89 | 62 | 93 | 65 | 95 |
| Amount of entrained air (vol. %) |  | 24.4 | 34.7 | 27.4 | 35.8 | 30.5 | 38.2 |

As is evident from Table 5, the mortars (16) and (23) in which the polycarboxylic acid polymer (6) or (7) having an n value of 150 was used in an amount of 0.2% by weight (solids) relative to the cement weight showed flow values (Y) of 90 mm and 92 mm, respectively, indicating sufficient fluidity. On the other hand, as is evident from Table 7, the comparative mortars (3), (5) and (7) in which the comparative polycarboxylic acid polymers (3) to (5) with an n value of 25 were respectively used in an amount of 0.2% by weight (solids) relative to the cement weight showed flow values (Y) of 61 to 65 mm and were inferior in fluidity in spite of the high mole ratios (0.15 to 0.45) of E1 in the polymers. For attaining the same flow value as shown by the mortar (16) and (23), namely 90±5 mm, using the comparative carboxylic acid polymers (3) to (5), it was necessary, as is evident from the data for comparative mortars (4), (6) and (8), to add the cement admixtures in an amount of 0.4 to 0.6% by weight (solids) relative to the cement weight, namely twice to three times as compared with the case of the present invention, hence said comparative polymers were economically disadvantageous.

Further, as is evident from Table 5, the mortars (23) to (29) in which the polycarboxylic acid polymer (7) having an m value of 20 in the repeating unit (D) was used gave an amount of entrained air of 4.2 to 5.6% by volume, which was smaller than that shown by the mortar, which has; no repeating unit (D) and which was an adequate level of amount of entrained air.

Furthermore, as is evident from Table 6, the mortars (30) to (35) in which the polycarboxylic acid polymers (8) and (9) prepared from a styrene-maleic anhydride copolymer having an increased weight average molecular weight (Mw) were used in an amount of 0.2% by weight (solids) relative to the cement weight each showed a flow value (Y) of not less than about 120 mm, proving excellent fluidity.

EXAMPLES 3 AND 4 AND COMPARATIVE EXAMPLES 3 TO 6

Flow Value (X) Measurement

Taiheiyo ordinary portland cement (product of Taiheiyo Cement; 800 g) and 400 g of Toyoura standard sand were dry-mixed in a mortar mixer (trademark: N-50; product of Tesco) at a low speed of revolution for 30 seconds. Then, 180 g of water with the polymer species specified in Table 8 was added to the dry mixed cement-sand mixture and the whole mixture was kneaded at a high speed of revolution for 3 minutes, to give a mortar. Each polymer was used in an amount of 0.4% by weight (as solids) relative to the cement weight. Attempts were made to keep the dry mixing and kneading conditions constant in preparing the respective mortars.

The mortars obtained in the above manner were evaluated. The results are shown in Table 8.

Evaluation Method (4) Flow Value (X)

A flow cone defined in JIS R 5201 as placed on a stainless steel plate was packed with each mortar prepared and then said flow cone was lifted vertically. The mortar that had spread on the stainless steel plate was measured for diameter in two crosswise directions. The mean of the two diameter values was reported as the flow value (X) [mm].

TABLE 8

|  | Example 3 | Example 4 | Comparative example 3 | Comparative example 4 | Comparative example 5 | Comparative example 6 |
|---|---|---|---|---|---|---|
| Polymer used for mortar preparation | Polycarboxylic acid polymer (3) | Polycarboxylic acid polymer (4) | Polycarboxylic acid dispersant (PC1) | Polycarboxylic acid dispersant (PC2) | Polycarboxylic acid polymer (8) | Polycarboxylic acid polymer (9) |
| Total polymer solids weight % relative to cement weight (wt. %/cement) | 0.4 | 0.4 | 0.4 | 0.4 | 0.4 | 0.4 |
| Flow value (X) [mm] | 387 | 364 | 120 | 105 | 108 | 105 |

INDUSTRIAL APPLICABILITY

The cement additive of the present invention, which is constituted as mentioned hereinabove, can give cement compositions which have high fluidity and good workability and an adequate level of air entraining ability resulting from its sufficient foaming preventing effect and are economical because of the required level of addition being low, while reducing the amount of water to be added to the cement compositions.

The cement composition of the present invention is excellent in dispersibility, has an adequate level of air entraining ability and can give cured cement products stable in strength.

The polycarboxylic acid polymer of the present invention is excellent in ability to disperse cement particles as well as inorganic powder and pigment particles and raises no coloration problem and, therefore, can judiciously be used as a cement additive, a dispersing agent for various applications, a builder for detergents, a scale inhibitor or the like.

What is claimed is:

1. A composition for using as a cement additive, which comprises, as a main component, a polycarboxylic acid polymer (X) which has;

a repeating unit (A) represented by the general formula (1);

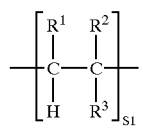

(1)

wherein $R^1$ and $R^2$ are the same or different and each represents a hydrogen atom or a univalent hydrocarbon group containing 1 to 30 carbon atoms and optionally $R^1$ and $R^2$ together are a divalent hydrocarbon group; $R^3$ represents a hydrogen atom, a phenyl group, an alkylphenyl group, a sulfonated phenyl group, an alkyl group containing 1 to 30 carbon atoms, an alkenyl group containing 2 to 30 carbon atoms, or a univalent organic group selected from the group consisting of —$OR^4$, —$OCOR^5$, —$X^1OR^6$, —$O(R^7O)aR^8$ and —CN; $R^4$ and $R^5$ each represents a univalent hydrocarbon group containing 1 to 30 carbon atoms; $X^1$ represents a bivalent hydrocarbon group containing 1 to 3 carbon atoms; $R^6$ and $R^8$ each represents a hydrogen atom or a univalent hydrocarbon group containing 1 to 30 carbon atoms; $R^7$ represents an alkylene group containing 2 to 30 carbon atoms; a represents the average number of oxyalkylene groups and is a positive number of 1 to 300; and S1 represents the mole ratio of the repeating unit in the polycarboxylic acid polymer (X), a repeating unit (B) represented by the general formula (2);

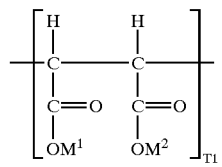

(2)

wherein $M^1$ and $M^2$ are the same or different and each represents a hydrogen atom, a metal atom, an ammonium group or a protonated organic amine; and T1 represents the mole ratio of the repeating unit in the polycarboxylic acid polymer (X), a repeating unit (C) represented by the general formula (3);

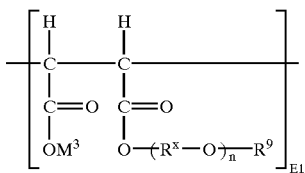

(3)

wherein $M^3$ represents a hydrogen atom, a metal atom, an ammonium group or a protonated organic amine; $R^9$ represents a univalent hydrocarbon group containing 1 to 30 carbon atoms; the $R^x$ groups are the same or different and each represents an alkylene group containing 2 to 18 carbon atoms, the majority of which are ethylene groups; n represents the average number of oxyalkylene groups and is a positive number; and E1 represents the mole ratio of the repeating unit in the polycarboxylic acid polymer (X), under the conditions that none of S1, T1 and E1 is equal to 0, that n is not less than 110, and that the weight average molecular weight Mw of said polycarboxylic acid polymer is not less than 10000 and not more than 500,000, and that T1 and E1 satisfy the relation;

0.03≦E1/(T1+E1)≦0.3.

2. A composition for using as a cement additive, which comprises, as a main component, a polycarboxylic acid polymer (X) which has;

a repeating unit (A) represented by the general formula (1):

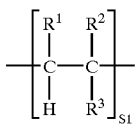

(1)

wherein $R^1$ and $R^2$ are the same or different and each represents a hydrogen atom or a univalent hydrocarbon group containing 1 to 30 carbon atoms and optionally $R^1$ and $R^2$ together are a divalent hydrocarbon group; $R^3$ represents a hydrogen atom, a phenyl group, an alkylphenyl group, a sulfonated phenyl group, an alkyl group containing 1 to 30 carbon atoms, an alkenyl group containing 2 to 30 carbon atoms, or a univalent organic group selected from the group consisting of —$OR^4$, —$OCOR^5$, —$X^1OR^6$, —$O(R^7O)_aR^8$ and —CN; $R^4$ and $R^5$ each represents a univalent hydrocarbon group containing 1 to 30 carbon atoms; $X^1$ represents a bivalent hydrocarbon group containing 1 to 3 carbon atoms; $R^6$ and $R^8$ each represents a hydrogen atom or a univalent hydrocarbon group containing 1 to 30 carbon atoms; $R^7$ represents an alkylene group containing 2 to 30 carbon atoms; a represents the average number of oxyalkylene groups and is a positive number of 1 to 300; and S1 represents the mole ratio of the repeating unit in the polycarboxylic acid polymer (X), a repeating unit (B) represented by the general formula (2):

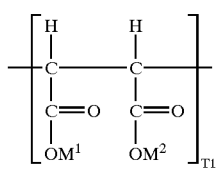
(2)

wherein $M^1$ and $M^2$ are the same or different and each represents a hydrogen atom, a metal atom, an ammonium group or a protonated organic amine; and T1 represents the mole ratio of the repeating unit in the polycarboxylic acid polymer (X), a repeating unit (C) represented by the general formula (3):

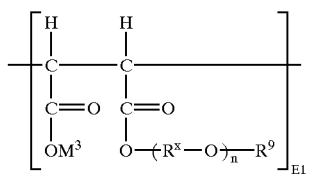
(3)

wherein $M^3$ represents a hydrogen atom, a metal atom, an ammonium group or a protonated organic amine; $R^9$ represents a univalent hydrocarbon group containing 1 to 30 carbon atoms; the $R^x$ groups are the same or different and each represents an alkylene group containing 2 to 18 carbon atoms, the majority of which are ethylene groups; n represents the average number of oxyalkylene groups and is a positive number; and E1 represents the mole ratio of the repeating unit in the polycarboxylic acid polymer (X), and a repeating unit (D) represented by the general formula (4):

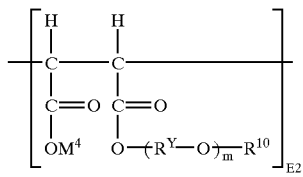
(4)

wherein $M^4$ represents a hydrogen atom, a metal atom, an ammonium group or a protonated organic amine; $R^{10}$ represents a univalent hydrocarbon group containing 1 to 30 carbon atoms; the $R^y$ groups are the same or different and each represents an alkylene group containing 2 to 18 carbon atoms, the majority of which are alkylene groups containing not less than 3 carbon atoms; m represents the average number of oxyalkylene groups and is a positive number; and E2 represents the mole ratio of the repeating unit in the polycarboxylic acid polymer (X), under the conditions that none of S1, T1, E1 and E2 is equal to 0, that n is not less than 110, that the weight average molecular weight Mw of said polycarboxylic acid polymer is not less than 10000 and not more than 500000, that T1 and E1 satisfy the relation: $0.01 \leq E1/(T1+E1) \leq 0.4$, and that E1 and E2 satisfy the relation;

$0.5 \leq E1/(E1+E2) \leq 0.99$.

3. A polycarboxylic acid polymer which has;

a repeating unit (G) represented by the general formula (8);

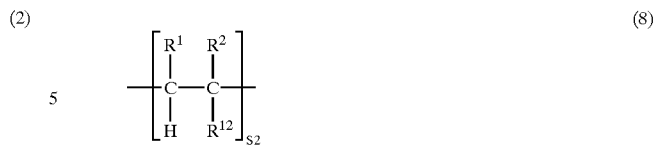
(8)

wherein $R^1$ and $R^2$ are the same or different and each represents a hydrogen atom or a univalent hydrocarbon group containing 1 to 30 carbon atoms and optionally $R^1$ and $R^2$ together are a divalent hydrocarbon group; $R^{12}$ represents $-OR^4$; $R^4$ represents a univalent hydrocarbon group containing 1 to 30 carbon atoms; and S2 represents the mole ratio of the repeating unit in the polycarboxylic acid polymer, a repeating unit (H) represented by the general formula (9);

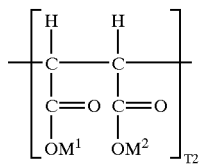
(9)

wherein $M^1$ and $M^2$ are the same or different and each represents a hydrogen atom, a metal atom, an ammonium group or a protonated organic amine; and T2 represents the mole ratio of the repeating unit in the polycarboxylic acid polymer, a repeating unit (I) represented by the general formula (10);

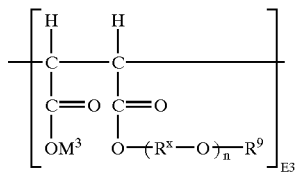
(10)

wherein $M^3$ represents a hydrogen atom, a metal atom, an ammonium group or a protonated organic amine; $R^9$ represents a univalent hydrocarbon group containing 1 to carbon atoms; the $R^x$ groups are the same or different and each represents an alkylene group containing 2 to 18 carbon atoms, the majority of which are ethylene groups; n represents the average number of oxyalkylene groups and is a positive number; and E3 represents the mole ratio of the repeating unit in the polycarboxylic acid polymer, and a repeating unit (J) represented by the general formula (11);

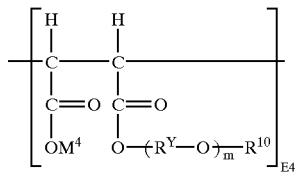
(11)

wherein $M^4$ represents a hydrogen atom, a metal atom, an ammnonium group or a protonated organic amine; $R^{10}$ represents a univalent hydrocarbon group containing 1 to 30 carbon atoms; the $R^Y$ groups are the same or different and each represents an alkylene group containing 2 to 18 carbon atoms, the majority of which are alkylene groups containing not less than 3 carbon atoms; and m represents the average number of oxyalkylene groups and is a positive number; and E4 represents the mole ratio of the repeating unit in the polycarboxylic acid polymer, under the conditions that neither of S2, T2, E3 and E4 is equal to 0 and that n is not less than 110, that the weight average molecular weight (Mw) of said polycarboxylic acid polymer being not less than 10000 and not more than 500,000, and that T2 and E3 satisfy the relation;

$$0.01 \leq E3/(T2+E3) \leq 0.4.$$

4. The composition for use as a cement additive according to claim 1, wherein the polycarboxylic acid polymer (X) has a repeating unit (D) represented by the general formula (4);

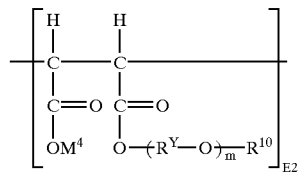

(4)

wherein $M^4$ represents a hydrogen atom, a metal atom, an ammonium group or a protonated organic amine; $R^{10}$ represents a univalent hydrocarbon group containing 1 to 30 carbon atoms; the $R^Y$ groups are the same or different and each represents an alkylene group containing 2 to 18 carbon atoms, the majority of which are alkylene groups containing not less than 3 carbon atoms; m represents the average number of oxyalkylene groups and is a positive number; and E2 represents the mole ratio of the repeating unit in the polycarboxylic acid polymer (X).

5. The polycarboxylic acid polymer according to claim 3, wherein E3 and E4 satisfy the relation;

$$0.5 \leq E3/(E3+E4) \leq 0.99.$$

6. A composition for use as a cement additive, which comprises, as a main component, a polycarboxylic acid polymer (X) which has;

a repeating unit (A) represented by the general formula (1);

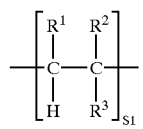

(1)

wherein $R^1$ and $R^2$ are the same or different and each represents a hydrogen atom or a univalent hydrocarbon group containing 1 to 30 carbon atoms and optionally $R^1$ and $R^2$ together are a divalent hydrocarbon group; $R^3$ represents a hydrogen atom, a phenyl group, an alkylphenyl group, a sulfonated phenyl group, an alkyl group containing 1 to 30 carbon atoms, an alkenyl group containing 2 to 30 carbon atoms, or a univalent organic group selected from the group consisting of $OR^4$, $-OCOR^5$, $-X^1OR^6$, $-O(R^7O)_aR^8$ and $-CN$; $R^4$ and $R^5$ each represents a univalent hydrocarbon group containing 1 to 30 carbon atoms; $X^1$ represents a bivalent hydrocarbon group containing 1 to 3 carbon atoms; $R^6$ and $R^8$ each represents a hydrogen atom or a univalent hydrocarbon group containing 1 to 30 carbon atoms; $R^7$ represents an alkylene group containing 2 to 30 carbon atoms; a represents the average number of oxyalkylene groups and is a positive number of 1 to 300; and S1 represents the mole ratio of the repeating unit in the polycarboxylic acid polymer (X), a repeating unit (B) represented by the general formula (2);

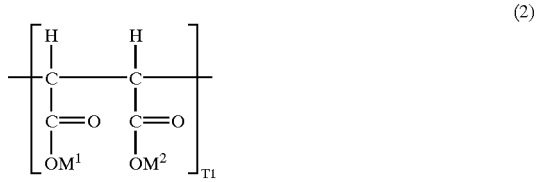

(2)

wherein $M^1$ and $M^2$ are the same or different and each represents a hydrogen atom, a metal atom, an ammonium group or a protonated organic amine; and T1 represents the mole ratio of the repeating unit in the polycarboxylic acid polymer (X), a repeating unit (C) represented by the, general formula (3);

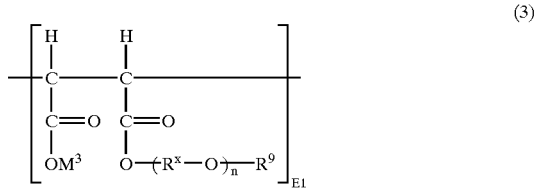

(3)

wherein $M^3$ represents a hydrogen atom, a metal atom, an ammonium group or a protonated organic amine; $R^9$ represents a univalent hydrocarbon group containing 1 to 30 carbon atoms; the $R^X$ groups are the same or different and each represents an alkylene group containing 2 to 18 carbon atoms, the majority of which are ethylene groups; n represents the average number of oxyalkylene groups and is a positive number; and E1 represents the mole ratio of the repeating unit in the polycarboxylic acid polymer (X), and a repeating unit (D) represented by the general formula (4);

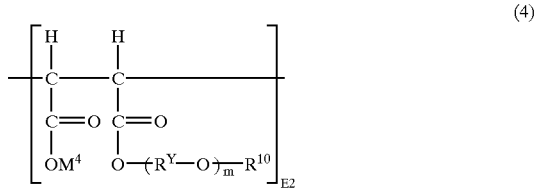

(4)

wherein $M^4$ represents a hydrogen atom, a metal atom, an ammonium group or a protonated organic amine; $R^{10}$ represents a univalent hydrocarbon group containing 1 to 30 carbon atoms; the $R^Y$ groups are the same or different and each represents an alkylene group containing 2 to 18 carbon atoms, the majority of which are alkylene groups containing not less than 3 carbon atoms; m represents the average number of oxyalkylene groups and is a positive number; and E2 represents the mole ratio of the repeating unit in the polycarboxlic acid polymer (X), under the conditions that none of S1, T1, E1 and E2 is equal to 0, that n is not less than 110, that the weight average molecular weight Mw of said polycarboxylic acid polymer is not less than 10000 and not more than 500,000.

* * * * *

UNITED STATES PATENT AND TRADEMARK OFFICE
CERTIFICATE OF CORRECTION

PATENT NO.    : 6,486,260 B1
DATED         : November 26, 2002
INVENTOR(S)   : Yuasa et al.

It is certified that error appears in the above-identified patent and that said Letters Patent is hereby corrected as shown below:

<u>Column 50,</u>
Line 47, change "1 to carbon" to -- 1 to 30 carbon --

Signed and Sealed this

Twenty-ninth Day of July, 2003

JAMES E. ROGAN
*Director of the United States Patent and Trademark Office*